United States Patent
Wang

(10) Patent No.: US 12,148,251 B2
(45) Date of Patent: Nov. 19, 2024

(54) MULTISOURCE COMPONENT REMOVAL LOCATION LABELING

(71) Applicant: The Boeing Company, Chicago, IL (US)

(72) Inventor: Changzhou Wang, Seattle, WA (US)

(73) Assignee: The Boeing Company, Chicago, IL (US)

( * ) Notice: Subject to any disclaimer, the term of this patent is extended or adjusted under 35 U.S.C. 154(b) by 286 days.

(21) Appl. No.: 17/588,391

(22) Filed: Jan. 31, 2022

(65) Prior Publication Data

US 2023/0298391 A1  Sep. 21, 2023

(51) Int. Cl.
*G07C 5/00* (2006.01)
*G07C 5/08* (2006.01)

(52) U.S. Cl.
CPC ............ *G07C 5/006* (2013.01); *G07C 5/008* (2013.01); *G07C 5/0816* (2013.01); *G07C 5/085* (2013.01)

(58) Field of Classification Search
CPC ...... G07C 5/006; G07C 5/008; G07C 5/0816; G07C 5/085
See application file for complete search history.

(56) References Cited

U.S. PATENT DOCUMENTS

2010/0250448 A1 * 9/2010 Towe ................... G06Q 10/067
                                                             705/305
2020/0193363 A1 * 6/2020 Jones ................... B60R 25/307

* cited by examiner

*Primary Examiner* — Andrew J Cromer
(74) *Attorney, Agent, or Firm* — Coats & Bennett, PLLC

(57) ABSTRACT

A computing device predicts whether a given component currently installed on a vehicle should be removed from the vehicle, and if so, identifies the location of the given component on the vehicle. The prediction is based on a prediction model that is generated by the computing device using maintenance data associated with the maintenance of components currently installed on, and/or previously removed from, the vehicle, as well as removal data associated with the previous removal of the same type of components from the vehicle. Information associated with the prediction is then output graphically to a display so that an operator can effect the removal of the component.

27 Claims, 16 Drawing Sheets

MAINTENANCE HISTORY RECORD 370
- VEHICLE IDENTIFIER 372
- RECORD CREATION DATE/TIME 374
- RECORD EXPIRATION DATE/TIME 376
- DESCRIPTION OF MAINTENANCE 378
- STATUS 380

FIG. 3C

MAINTENANCE RECORD 350
- VEHICLE IDENTIFIER 352
- MAINTENANCE TYPE 354
- MAINTENANCE TIME 356
- DESCRIPTION OF COMPLAINT 358
- DESCRIPTION OF MAINTENANCE ACTION 360

FIG. 3B

MULTISOURCE COMPONENT REMOVAL LOCATION LABELING

TECHNOLOGICAL FIELD

The present disclosure relates generally to the field of vehicle maintenance systems, and more specifically to computer devices for predicting when components on the vehicle should be removed from a vehicle.

BACKGROUND

Many industries typically expend a large amount of time and money inspecting their products for inconsistencies, irregularities, artifacts, impacts, faults, tolerance thresholds, and the like. Consider, for example, the aerospace industry. Manufacturers and operators of commercial aircraft are required to follow an inspection program approved by an appropriate federal authority, such as the Federal Aviation Administration (FAA). Generally, the type of inspection performed on an aircraft will vary with the type of aircraft, as well as with different usage parameters, such as the number of flight hours, the calendar time (e.g., monthly, bi-annually, etc.), and the number of flight cycles.

Typically, the components installed on a vehicle, such as an aircraft, for example, are removed and replaced with new or repaired components. In almost all cases, the components interact with other components and systems installed on the aircraft. However, these interactions can be very complex, which can make it difficult to determine which particular components to remove or replace and/or when they should be removed or replaced.

SUMMARY

The present disclosure configures a computing device to predict when a component currently installed on a vehicle, such as an aircraft, for example should be removed from the vehicle. Additionally, aspects of the present disclosure determine a location of the component on the vehicle. The predictions are based on a prediction model generated by the computing device based on data associated with the maintenance to the components of the vehicle and the previous removal of components from the vehicle.

Accordingly, in one aspect of the present disclosure, a computing device comprises processing circuitry and memory. The memory comprises instructions that are executable by the processing circuitry. When executed, the computing device is configured to obtain a plurality of maintenance records and a plurality of removal records for the vehicle. The plurality of maintenance records comprise maintenance information associated with maintenance performed on vehicle components currently installed on the vehicle or previously removed from the vehicle. The plurality of removal records comprise removal information associated with vehicle components previously removed from the vehicle. The processing circuitry is also configured to determine, based on the plurality of maintenance records and on the plurality of removal records, a location of a selected vehicle component on the vehicle and to generate a component removal prediction model based on the plurality of maintenance records and the plurality of removal records for the vehicle. Based on the component removal prediction model, the processing circuitry is configured to predict whether the selected vehicle component is to be removed from the vehicle. Responsive to determining that the selected vehicle component is to be removed, the processing circuitry is configured to generate a visual representation of the vehicle. In this aspect, the visual representation of the vehicle graphically represents the vehicle, the selected vehicle component, the location of the selected vehicle component on the vehicle, and comprises a reference to a section in a vehicle maintenance manual associated with a procedure for removing the selected vehicle component from the vehicle. The processing circuitry is also configured to output the visual representation to a graphical user interface for display to a user.

In one aspect, the processing circuitry is configured to generate a set of regular expression patterns based on one or more of an operator associated with maintenance of the vehicle, a model of the vehicle, a sub-model of the vehicle, and data associated with the selected vehicle component.

According to one aspect, to determine the location of the selected vehicle component on the vehicle, the processing circuitry is configured to apply the set of regular expression patterns to a component location field in one or more of the removal records.

In such aspects, when the location of the selected vehicle component is not determined, the processing circuitry is further configured to re-apply the set of regular expression patterns to one or more of a component description field, a removal reason field, and an action field in one or more of the removal records, and determine the location of the selected vehicle component based on the re-applying.

In one aspect, the processing circuitry is configured to generate a set of regular expression patterns based on one or more of a vehicle component identifier, a removal reason description, a removal action description, a removal timestamp, and a subset of one or more target locations for the selected vehicle component on the vehicle.

In such aspects, to determine the location of the selected vehicle component on the vehicle, the processing circuitry is configured to assign the plurality or removal records to groups of removal records by applying the set of regular expression patterns to the plurality of removal records. Each group of removal records comprises two or more removal records associated with a respective vehicle component. Additionally, for each group of removal records, the processing circuitry is configured to determine a location of at least one vehicle component in the group, and assign the location of the at least one vehicle component in the group to each removal record the group.

In one aspect, the location of the selected vehicle component is determined based on the location the at least one vehicle component in the group.

In one aspect, each of the plurality of removal records comprises a timestamp. Additionally, the timestamp for each of the two or more removal records in a given group falls within a predetermined time window.

In one aspect, the two or more removal records are assigned to a corresponding group of removal records responsive to determining that a total number of removal records in the group matches a number of target locations.

In another aspect of the present disclosure, to determine the location of the selected vehicle component on the vehicle, the processing circuitry is configured to generate a set of candidate maintenance records from the plurality of maintenance records for the vehicle. Each candidate maintenance record is associated with one or more of the plurality of removal records based on a predetermined time window. The processing circuitry in this aspect is also configured to filter the set of candidate maintenance records according to a first predetermined criteria to generate a filtered set of candidate maintenance records, extract the location of a vehicle component from the filtered set of candidate maintenance records, and determine the location of the selected vehicle component to be the location extracted from the filtered set of candidate records.

In one aspect, to generate a set of candidate maintenance records, the processing circuitry is configured to determine the predetermined time window for the one or more maintenance records, and include a given maintenance record in the set of candidate maintenance records. In this aspect, the given maintenance record is included responsive to determining that a vehicle identifier in the given maintenance record matches a vehicle identifier in one or more of the plurality of removal records, and a timestamp in the given maintenance record matches a removal timestamp in one or more of the plurality of removal records within a predetermined time period.

In one aspect, the first predetermined criteria comprises a regular expression pattern representing an action performed on the selected vehicle component.

In one aspect, to extract the location of a vehicle component from the filtered set of candidate maintenance records, the processing circuitry is configured to generate an ordered set of candidate maintenance records from the filtered set of candidate maintenance records according to a time of a maintenance action, select a first candidate maintenance record from the ordered set of candidate maintenance records based on when the vehicle components associated with the candidate maintenance records were removed from the vehicle, and determine the location of the selected vehicle component to be the location associated with the vehicle component of the first candidate maintenance record.

Additionally, in one aspect, if the location cannot be extracted from the filtered set of candidate maintenance records, the processing circuitry is configured to filter the set of candidate maintenance records based on a second predetermined criteria to generate a second filtered set of candidate maintenance records, extract the location from the second filtered set of candidate maintenance records, and determine the location of the selected vehicle component to be the location extracted from the second filtered set of candidate maintenance records.

In another aspect of the present disclosure, to determine the location of the selected vehicle component on the vehicle, the processing circuitry is configured to generate a set of candidate removal requests from the plurality of maintenance records for the vehicle. Each candidate removal request is associated with one or more of the plurality of removal records based on a predetermined time window. Additionally, in this aspect, the computing device is also configured to generate a filtered set of candidate removal requests based on one of a component name and a component part number, extract the location of a vehicle component from the filtered set of candidate removal requests, and determine the location of the selected vehicle component to be the location extracted from the filtered set of candidate removal requests.

In one aspect, the processing circuitry is further configured to generate the graphical user interface to include the visual representation of the vehicle, the selected vehicle component, and the location of the selected vehicle component on the vehicle, and to identify the location of the selected vehicle component on the vehicle.

Another aspect of the present disclosure provides a method for generating a removal prediction model for a vehicle component. In this aspect, the method comprises the steps of obtaining a plurality of maintenance records for a vehicle, and obtaining a plurality of removal records for the vehicle. The plurality of maintenance records comprise maintenance information associated with maintenance performed on vehicle components currently installed on the vehicle or previously removed from the vehicle, and the plurality of removal records comprise removal information associated with vehicle components previously removed from the vehicle. Additionally, the method comprises the steps of determining, based on the plurality of maintenance records and on the plurality of removal records, a location of a selected vehicle component on the vehicle, generating a component removal prediction model based on the plurality of maintenance records and the plurality of removal records for the vehicle, and predicting, based on the component removal prediction model, whether the selected vehicle component is to be removed from the vehicle. Responsive to determining that the selected vehicle component is to be removed, the method further comprises the steps of generating a visual representation of the vehicle. In this aspect, the visual representation of the vehicle graphically represents the vehicle, the selected vehicle component, the location of the selected vehicle component on the vehicle, and a reference to a section in a vehicle maintenance manual associated with a procedure for removing the selected vehicle component from the vehicle. The method further comprises the steps of outputting the visual representation to a graphical user interface for display to a user.

In one aspect, the method further calls for generating a set of regular expression patterns based on one or more of an operator associated with the maintenance of the vehicle, a model of the vehicle, a sub-model of the vehicle, and data associated with the selected vehicle component.

In one aspect, determining the location of the selected vehicle component on the vehicle comprises applying the set of regular expression patterns to a component location field in one or more of the removal records.

In one aspect, when the location of the selected vehicle component is not determined, the method further comprises the steps of re-applying the set of regular expression patterns to one or more of a component description field, a removal reason field, and an action field in one or more of the removal records, and determining the location of the selected vehicle component based on the re-applying.

In one aspect, the method calls for generating a set of regular expression patterns based on one or more of a vehicle component identifier, a removal reason description, a removal action description, a removal timestamp, and a subset of one or more target locations for the selected vehicle component on the vehicle. Additionally, to determine the location of the selected vehicle component on the vehicle, the method calls for assigning the plurality or removal records to groups of removal records by applying the set of regular expression patterns to the plurality of removal records. Each group of removal records comprises two or more removal records associated with a respective vehicle component. For each group of removal records, the method calls for determining a location of at least one vehicle component in the group, assigning the location of the at least one vehicle component to each removal record the group.

In one aspect, to determine the location of the selected vehicle component on the vehicle, the method calls for generating a set of candidate maintenance records from the plurality of maintenance records for the vehicle, wherein each candidate maintenance record is associated with one or more of the plurality of removal records based on a predetermined time window, filtering the set of candidate maintenance records according to a first predetermined criteria to generate a filtered set of candidate maintenance records, extracting the location of a vehicle component from the filtered set of candidate maintenance records, and determining the location of the selected vehicle component to be the location extracted from the filtered set of candidate records.

In one aspect, to generate a set of candidate maintenance records, the method further calls for determining a predetermined time window for the one or more maintenance records. A given maintenance record is included in the set of candidate maintenance records responsive to determining that a vehicle identifier in the given maintenance record matches a vehicle identifier in one or more of the plurality of removal records, and a timestamp in the given maintenance record matches a removal timestamp in one or more of the plurality of removal records within the predetermined time window.

In one aspect, to extract the location of a vehicle component from the filtered set of candidate maintenance records, the method calls for generating an ordered set of candidate maintenance records from the filtered set of candidate maintenance records according to a time of a maintenance action, selecting a first candidate maintenance record from the ordered set of candidate maintenance records based on when the vehicle components associated with the candidate maintenance records were removed from the vehicle, and determining the location of the selected vehicle component to be the location associated with the vehicle component of the first candidate maintenance record.

In one aspect, if the location cannot be extracted from the filtered set of candidate maintenance records, the method calls for filtering the set of candidate maintenance records based on a second predetermined criteria to generate a second filtered set of candidate maintenance records, extracting the location from the second filtered set of candidate maintenance records, and determining the location of the selected vehicle component to be the location extracted from the second filtered set of candidate maintenance records.

In one aspect, to determine the location of the selected vehicle component on the vehicle, the method calls for generating a set of candidate removal requests from the plurality of maintenance records for the vehicle. Each candidate removal request is associated with one or more of the plurality of removal records based on a predetermined time window. The method also calls for filtering the set of candidate removal requests based on one of a component name and a component part number to generate a filtered set of candidate removal requests, extracting the location of a vehicle component from the filtered set of candidate removal requests, and determining the location of the selected vehicle component to be the location extracted from the filtered set of candidate removal requests.

Another aspect of the present disclosure provides a non-transitory computer-readable medium comprising instructions stored thereon that, when executed by processing circuitry of a computing device, configure the computing device to obtain a plurality of maintenance records and a plurality of removal records for the vehicle. The plurality of maintenance records comprise maintenance information associated with maintenance performed on vehicle components currently installed on the vehicle or previously removed from the vehicle. The plurality of removal records comprise removal information associated with vehicle components previously removed from the vehicle. The instructions also configure the computing device to determine, based on the plurality of maintenance records and on the plurality of removal records, a location of a selected vehicle component on the vehicle and to generate a component removal prediction model based on the plurality of maintenance records and the plurality of removal records for the vehicle. Based on the component removal prediction model, the instructions also configure the computing device to predict whether the selected vehicle component is to be removed from the vehicle. Responsive to determining that the selected vehicle component is to be removed, the instructions also configure the computing device to generate a visual representation of the vehicle. In this aspect, the visual representation of the vehicle graphically represents the vehicle, the selected vehicle component, the location of the selected vehicle component on the vehicle, and comprises a reference to a section in a vehicle maintenance manual associated with a procedure for removing the selected vehicle component from the vehicle. The instructions also configure the computing device to output the visual representation to a graphical user interface for display to a user.

The features, functions, and advantages that have been discussed can be achieved independently in various aspects or may be combined in yet other aspects, further details of which can be seen with reference to the following description and the drawings.

BRIEF DESCRIPTION OF THE DRAWINGS

Figure 1:
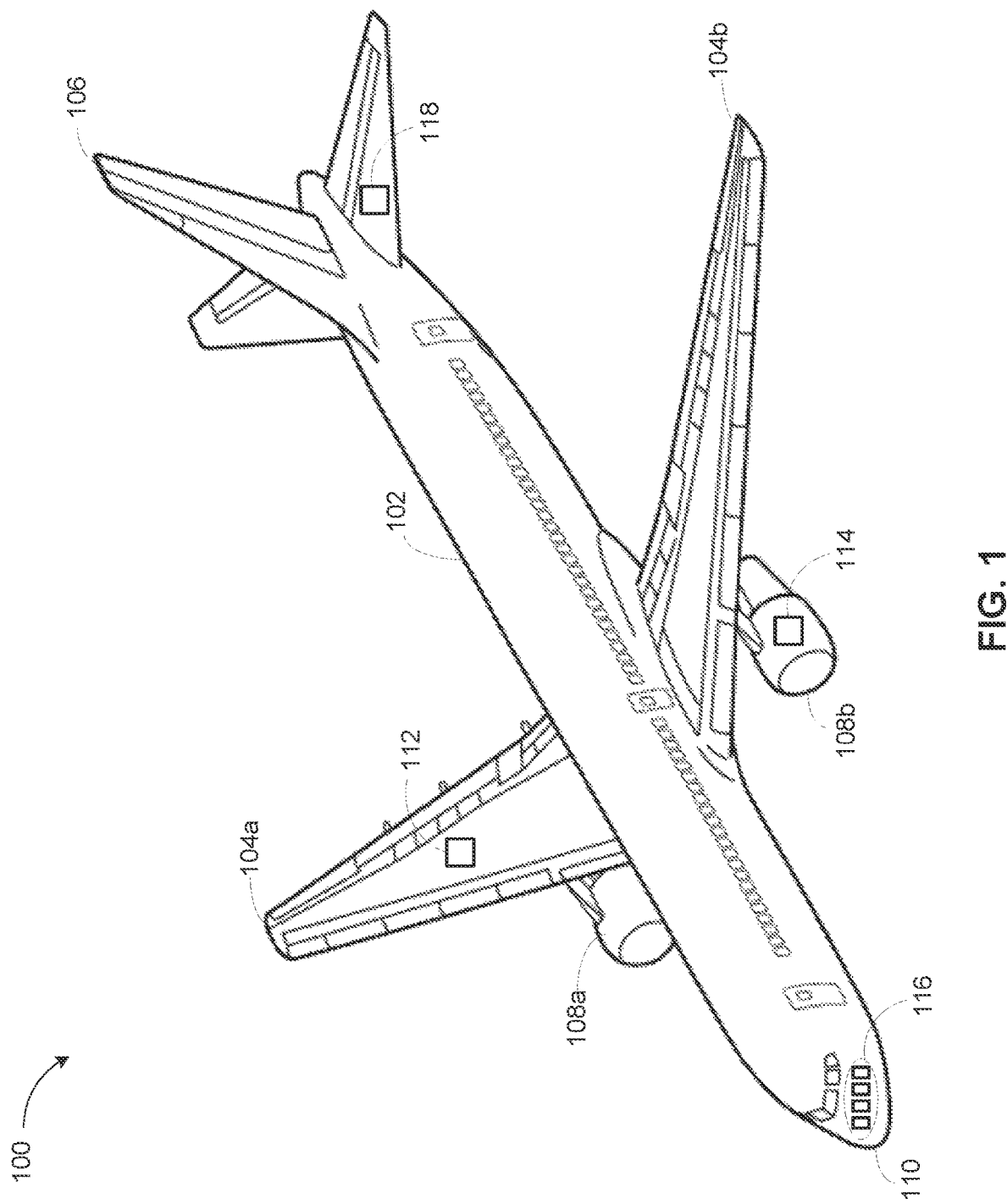

Having thus described variations of the disclosure in general terms, reference will now be made to the accompanying drawings, which are not necessarily drawn to scale, and wherein:

FIG. 1 is a perspective view illustrating an example vehicle and some of its components according to one aspect of the present disclosure.

Figure 2:
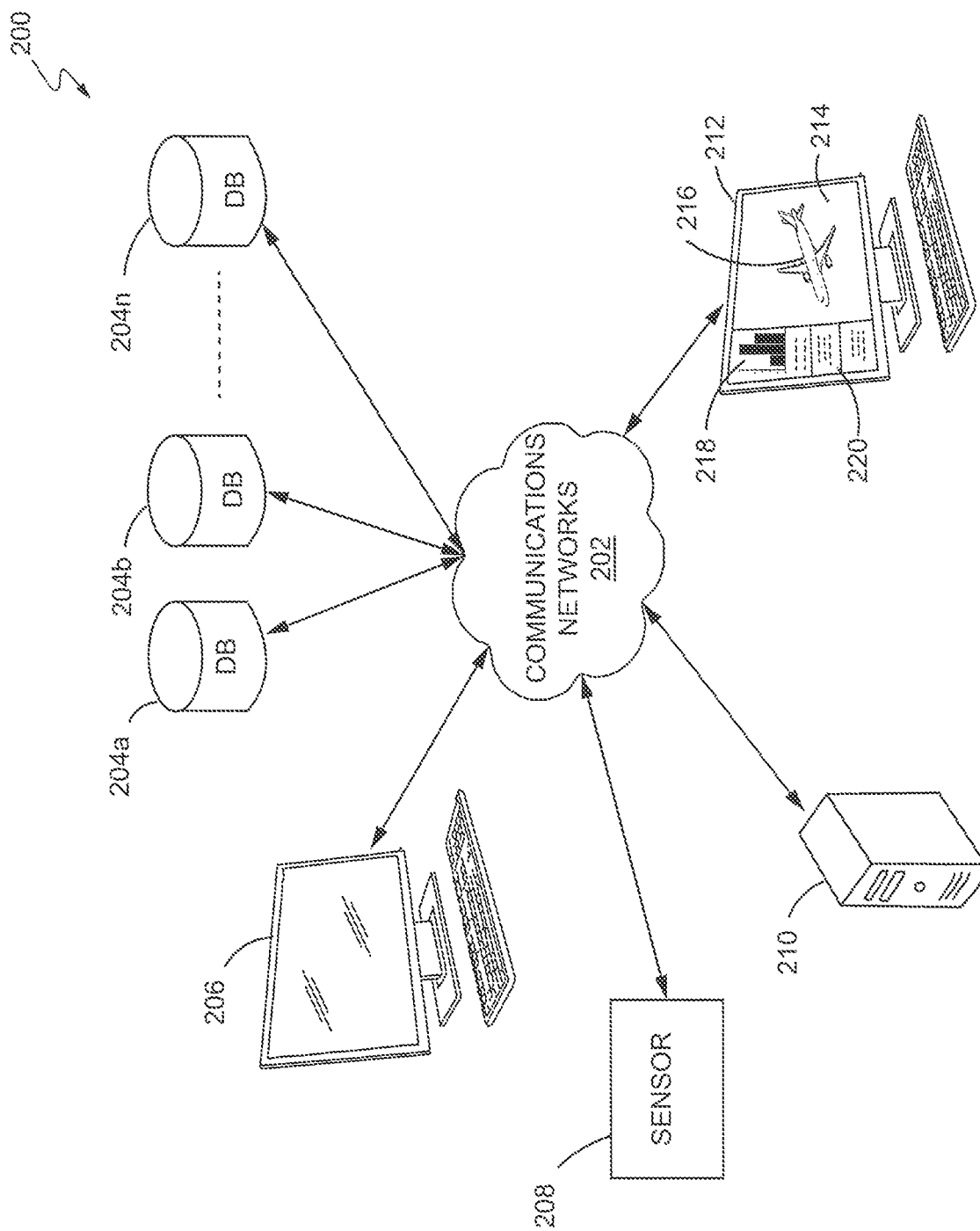

FIG. 2 illustrates a computer network configured according to one aspect of the present disclosure.

Figure 3A:
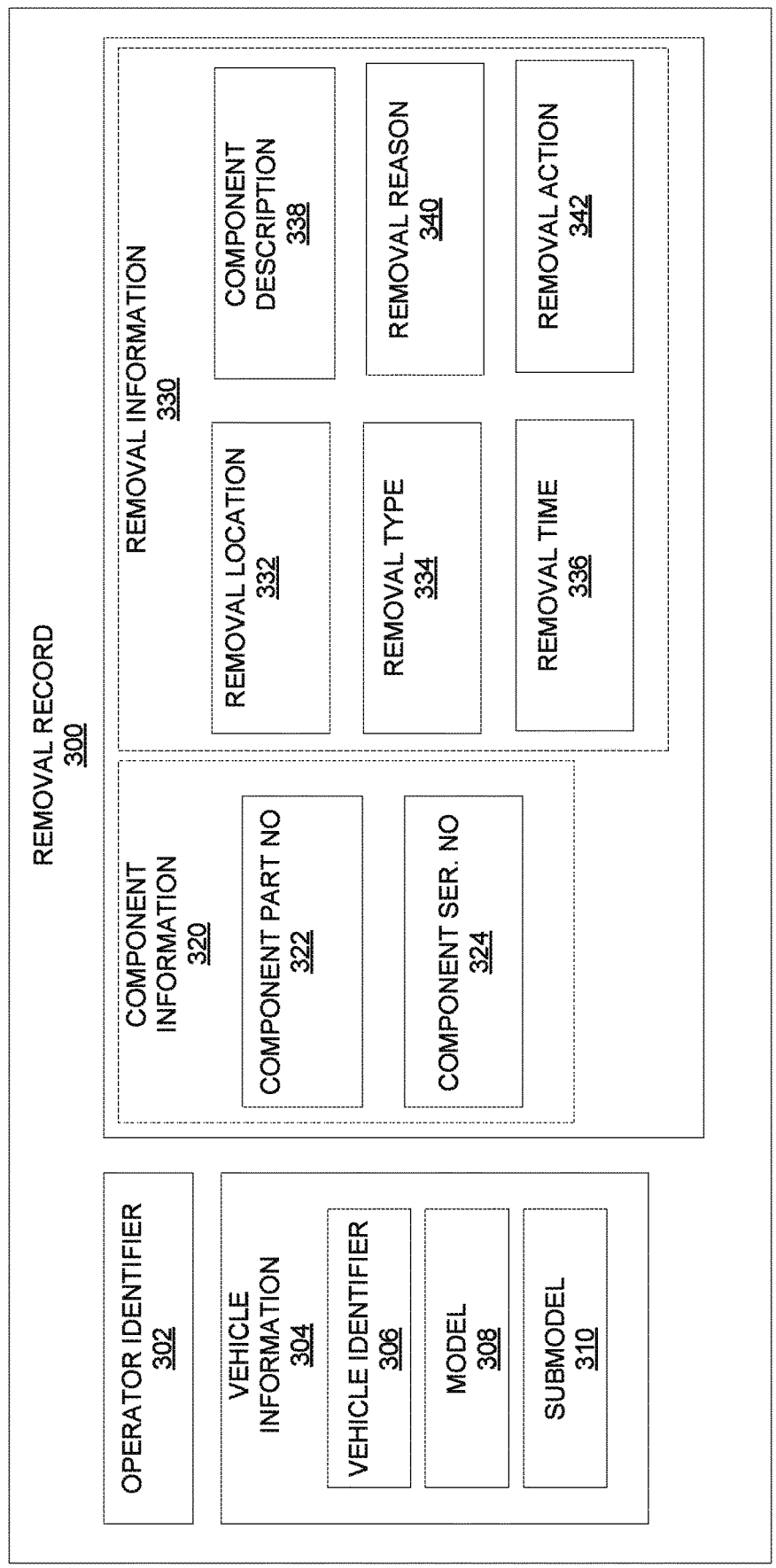

FIGS. 3A-3C illustrate example structures for various data records according to one aspect of the present disclosure.

Figure 3D:
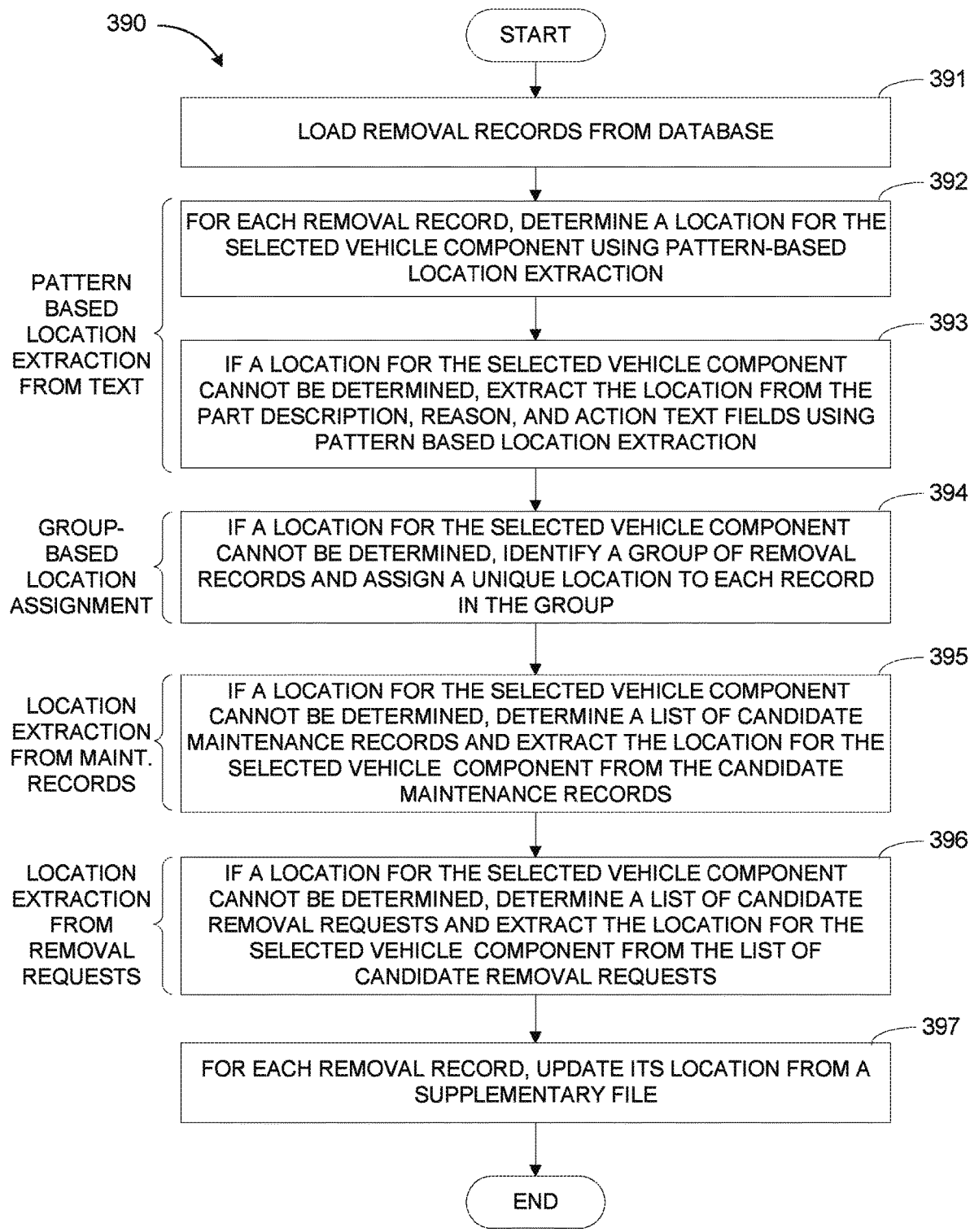

FIG. 3D is a flow diagram illustrating a method for processing data to determine a location of a vehicle component according to one aspect of the present disclosure.

Figure 4:
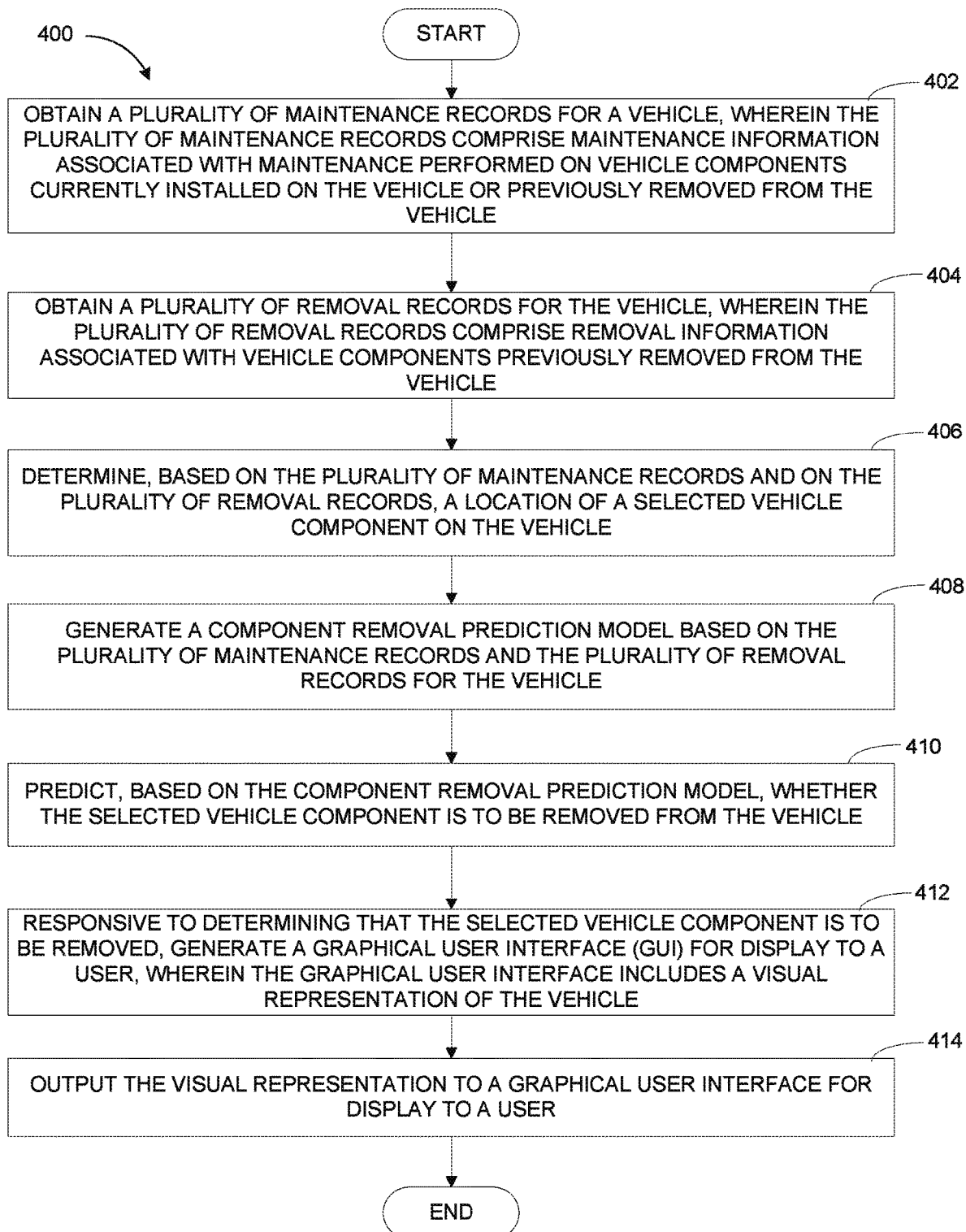

FIG. 4 is a flow diagram illustrating a method for predicting whether a component currently installed on a vehicle should be removed according to one aspect of the present disclosure.

FIGS. 5-8 are flow diagrams illustrating methods for determining a location of a vehicle component currently installed on a vehicle according to aspects of the present disclosure.

Figure 9:
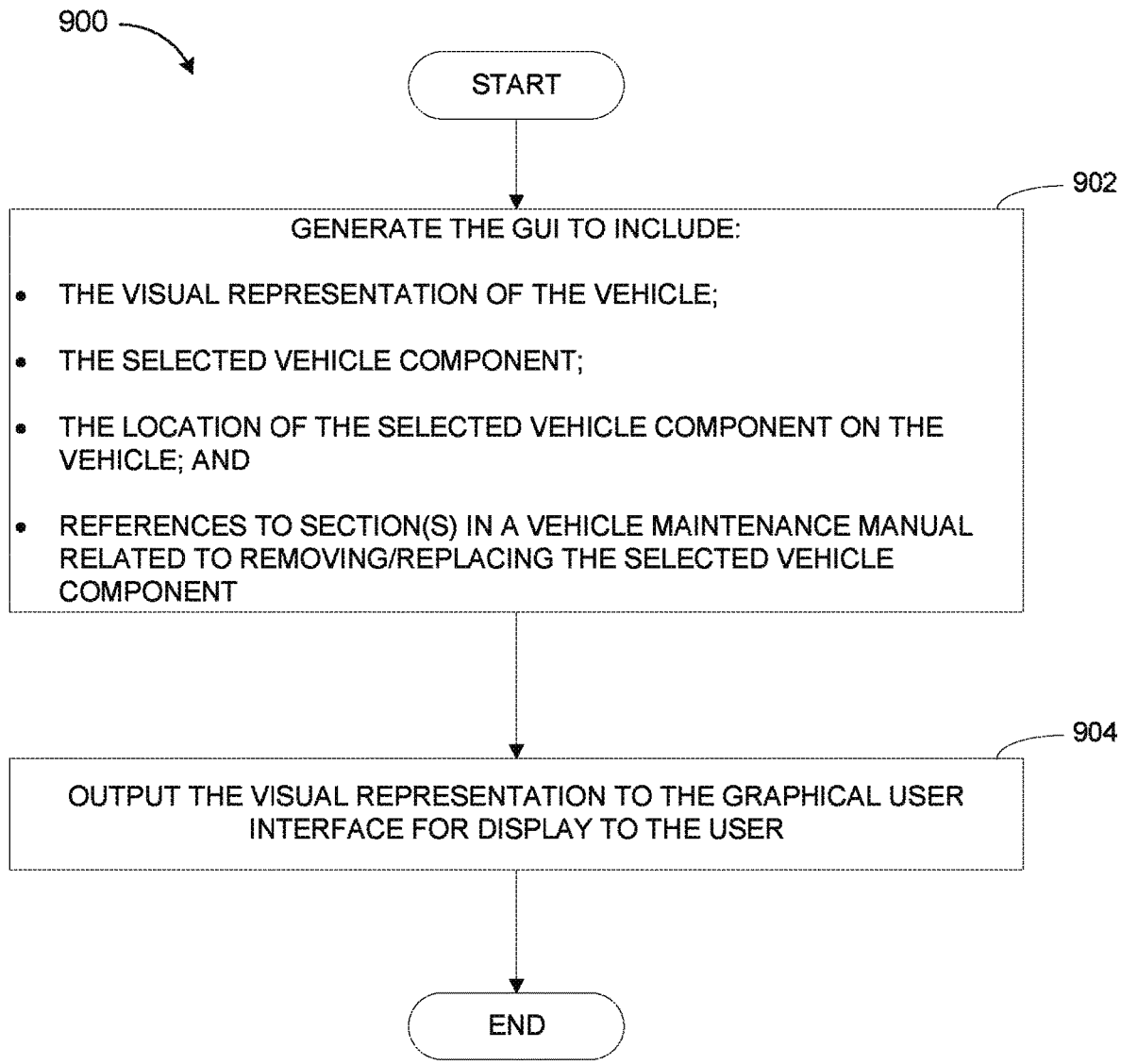

FIG. 9 is a flow diagram illustrating a method for generating a graphical user interface (GUI) according to one aspect of the present disclosure.

Figure 10:
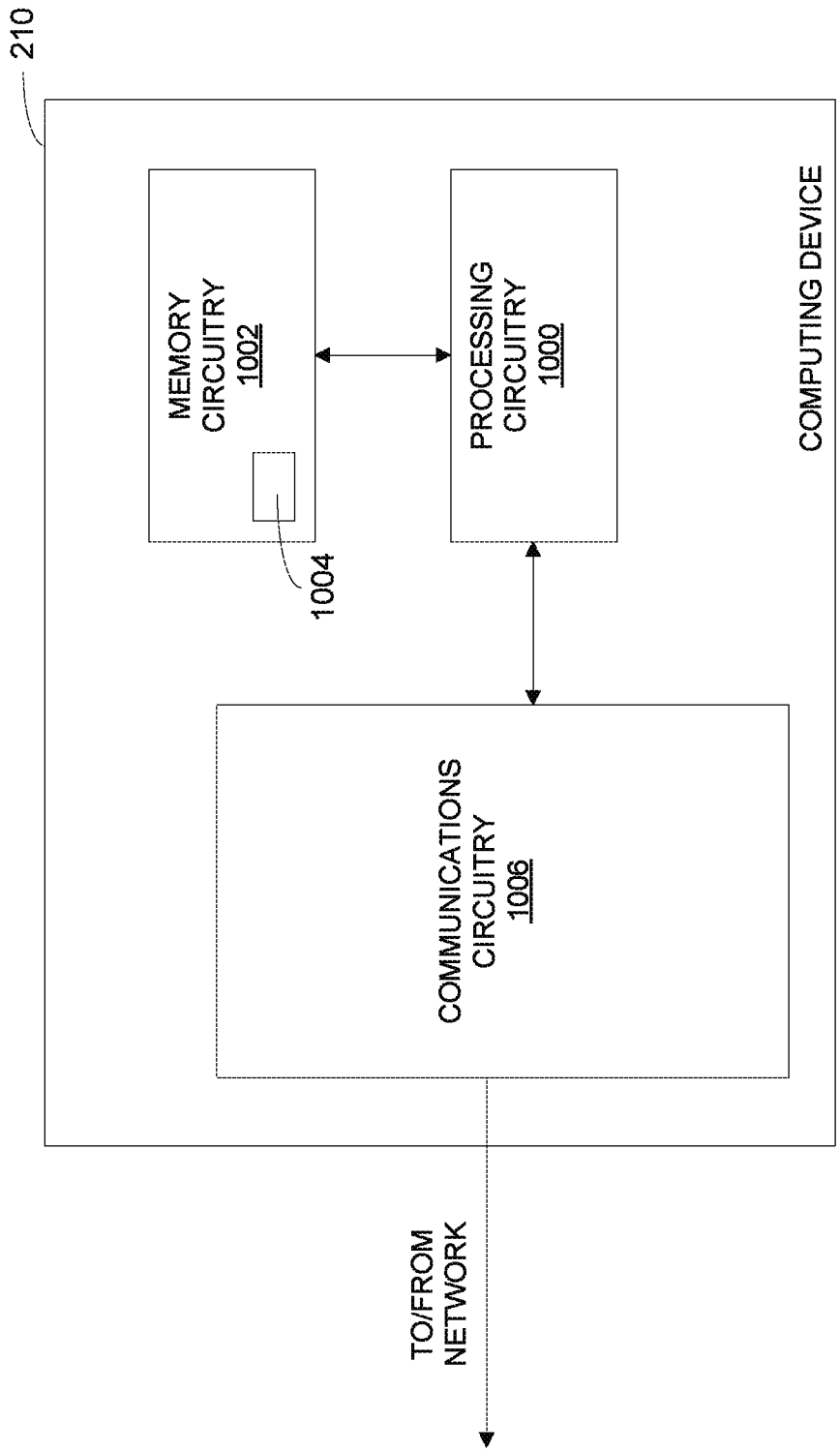

FIG. 10 is a schematic diagram illustrating a computing device configured according to one aspect of the present disclosure.

Figure 11:
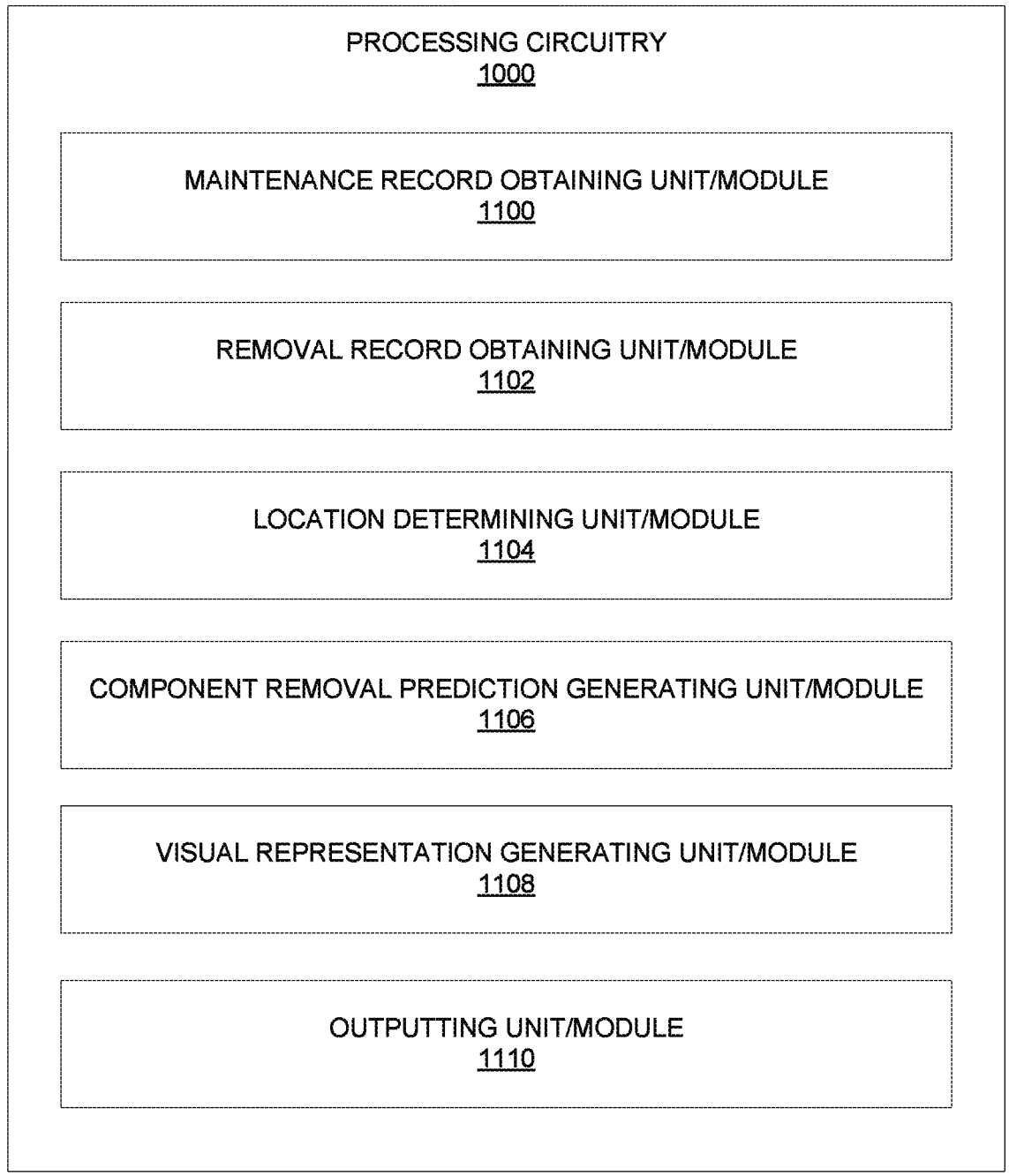

FIG. 11 is a functional block diagram illustrating a computer program product according to one aspect of the present disclosure.

Figure 12:
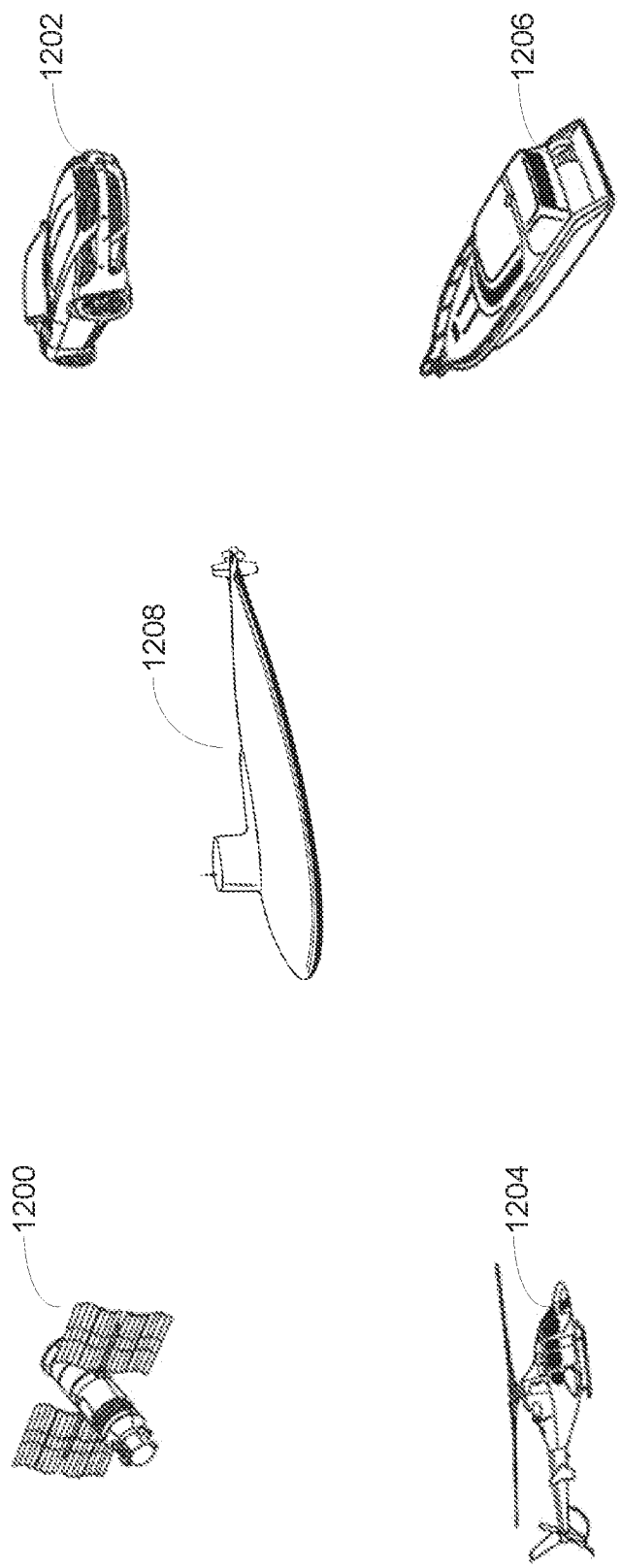

FIG. 12 illustrates some additional example vehicles suitable for use with aspects of the present disclosure.

DETAILED DESCRIPTION

Aspects of the present disclosure provide a computing device configured to predict whether a given component currently installed on a vehicle should be removed from the vehicle. The prediction is based on a prediction model that is generated by the computing device using maintenance records associated with the maintenance of components currently installed on, and previously removed from, the vehicle, as well as removal records associated with the removal of the same or similar type of components previously removed from the vehicle. Based on the prediction model, the computing device determines whether a given component currently installed on the vehicle should be removed from the vehicle, as well as its removal location on the vehicle.

Responsive to determining that the given vehicle component should be removed, the computing device generates a visual representation of the vehicle and outputs the visual representation to an operator in a graphical user interface (GUI). In aspects of the present disclosure, the graphical representation of the vehicle illustrates a selected vehicle component to be removed, the location of the selected vehicle component on the vehicle, and a reference to a section in a vehicle maintenance manual associated with removing and/or replacing the selected vehicle component.

Turning now to the drawings, FIG. 1 illustrates a vehicle 100 configured according to an aspect of the present disclosure. In the illustrated example, vehicle 100 is an aircraft. However, those of ordinary skill in the art will appreciate that this is for illustrative purposes only. In other examples, seen in a later figure, vehicle 100 may be another type of vehicle including, but not limited to, ships, cars, spacecraft, and the like. Thus, according to the aspects disclosed herein, predicting whether a given component should be removed and determining the location of that component on a vehicle 100 other than an aircraft is also possible.

As seen in FIG. 1, vehicle 100 includes a fuselage 102, wings 104a, 104b, a tail section 106, engines 108a, 108b, and a nose 110. Additionally, vehicle 100 also comprises a variety of vehicle components. Such components may be installed or positioned anywhere on vehicle 100 and include, but are not limited to, one or more wing-based components 112 (e.g., a flight control member or fuel measurement device), engine-based components 114 (e.g., a low or high pressure compressor), tail-based components 118 (e.g., an Air Cycle Air Conditioning (ACAC) system or a valve for an ACAC system), and one or more components or groups of components 116 (e.g., control panels, flight control members) located in or near the cockpit or nose 110 of vehicle 100. Other components and/or and groups of components may be located internally or externally of the cabin area of fuselage 102 and include, for example, the components of a Cabin Air Compressor (CAC).

Vehicle 100 also comprises a variety of sensors and other devices and systems configured to monitor the vehicle components before, during, and after flight operations. The sensors and monitoring devices measure the operation of respective vehicle components or groups of vehicle components, and send values and/or signals representing those measurements to various computing systems for storage and/or analysis. One such system is illustrated in FIG. 2 as system 200.

As seen in FIG. 2, system 200 comprises one or more public and/or private communications networks 202 communicatively interconnecting one or more databases (DBs) 204a, 204b, . . . , 204n (collectively herein, "DB 204"), a user input terminal 206, one or more sensors 208 on vehicle 100, a network-based computing device (e.g., a server device) 210, and a user output terminal 212. It is possible that system 200 comprises other network devices and components not explicitly illustrated herein. However, those of ordinary skill in the art will readily appreciate that such other devices and/or components are omitted from FIG. 2 simply for ease of discussion.

In one aspect, the one or more communications networks 202 are configured to carry data packets, and as such, may comprise any type of public and/or private data network known in the art. Such networks include, without limitation, Internet Protocol (IP) networks such as the Internet, one or more ETHERNET networks, any of the various existing satellite networks and/or wireless networks, and any combination thereof. In some aspects, the one or more communications networks 202 may comprise one or more busses that allow microcontrollers and other devices on board an aircraft, such as sensors 208, for example, to communicate avionics data with each other, and eventually, with one or more of the entities connected to communications networks 202. Such busses may include, for example and without limitation, a Controller Area Network (CAN bus) and an Aeronautical Radio INC (ARINC) 429 bus.

According to aspects of the present disclosure, communications networks 202 facilitates the storage of data received from the sensors 208 and/or user input terminal 206 into one or more of the appropriate DBs 204. For example, DB 204a may be configured to store maintenance data (e.g., maintenance records) associated with the maintenance of vehicle components that are currently installed on vehicle 100 and that have already been removed from vehicle 100. Similarly, DB 204b may be configured to store removal records associated with vehicle components that have been previously removed from vehicle 100. As described in more detail later, this data is used according to the present disclosure for prediction modeling. Whatever the data, though, communications networks 202 facilitates the communication of that data between the various devices connected to it.

In one aspect, user input terminal 206 and sensors 208 provide the data and signals stored in one or more of the DBs 204 and, as described in more detail later, for analysis by computing device 210. For example, sensors 208 monitor the operation of one or more vehicle components and send measurement values associated with the operation of those components to DBs 204 for storage. For example, consider sensors 208 tasked with monitoring the ACAC system of an aircraft. In these aspects, sensors 208 may measure and send one or more values representing the detected temperature and humidity of the interior of the cabin, as well as the operational mode the ACAC system is operating in at the time the measurements are taken. Similarly, other sensors 208 on the aircraft may measure and send values representing a velocity and the altitude of the aircraft at the time the temperature and humidity readings are taken.

Alternatively, or in addition to sensors 208, users such as maintenance and/or operational personnel, for example, may manually provide data values for these and other features of the aircraft via user input terminal 206. Such data includes, but is not limited to, data and information regarding the removal of one or more components from the aircraft. Regardless of how the data is provided, however, values that are measured by sensors 208 and/or input by a user via user input terminal 206 may be communicated to communications networks 202 and stored in one or more of the DBs 204 for subsequent processing and analysis.

Computing device 210, which as stated above may be a computer server, comprises a network-based computing device that is configured to predict whether a given vehicle component currently installed on vehicle 100 should be removed, and if so, determine the location of the given vehicle component on vehicle 100. Computing device 210 is also configured according to the present embodiments to generate a graphical user interface (GUI) 214 for output to a user. As described in more detail later, computing device 210 generates GUI 214 visually representing vehicle 100, as well as icons or other graphical indicators representing a selected vehicle component 216 to be removed according to the prediction, and a location of the selected vehicle component 216 on vehicle 100. Additionally, in at least one aspect, GUI 214 is generated to include graphical indicators 218 such as one or more graphs, diagrams, and/or other information helpful for visualizing the predicted removal for the user, as well as a recommendation 220 for removing the vehicle component. For example, in one aspect, the recommendation 220 displays a hyperlink to a particular maintenance manual and/or section of the maintenance manual associated with the process of safely removing/replacing the selected vehicle component 216. Recommendation 220 may also include hyperlinks to other manuals and/or information associated with the vehicle 100, the selected vehicle component to be removed, and/or the removal/replacement process.

As previously stated, aspects of the present disclosure generate a prediction model for predicting whether a given component currently installed on vehicle 100 should be removed. The prediction model is generated based on maintenance data for the vehicle components currently installed on, and previously removed from, vehicle 100 and removal data associated with the vehicle components that have already been removed from vehicle 100. Such data may be stored, for example, as data records in DB 204.

FIGS. 3A-3C illustrate some of the various data records used when generating a prediction model according to one aspect of the present disclosure. FIG. 3A illustrates an exemplary example of a removal record 300 in accordance with an aspect of the disclosure. In this aspect, removal record 300 comprises a plurality of data fields for storing information associated with the removal of a component from vehicle 100. Such fields include, for example, an operator identifier field 302 for storing data identifying the particular operator (e.g., a technician, supervisor, or organization such as an airline) that removed or was responsible for removing, the component from vehicle 100. The removal record 300 also includes vehicle information 304 that uniquely identifies the vehicle 100 from which the component was removed. In this aspect, the vehicle information 304 comprises a vehicle identifier field 306 for storing a VIN or other unique identifier for vehicle 100, a vehicle model field 308 for storing the make and/or model of the vehicle 100, and a vehicle sub-model field 310 for storing data associated with the particular sub-model of the vehicle 100.

The removal record 300 further includes component information 320 for storing data that uniquely identifies the vehicle component removed from vehicle 100. In this aspect, for example, component information 320 comprises a component part number field 322 and a component serial number field 324.

The removal record 300 may further include removal information 330 comprising data fields associated with the removal of the vehicle component from vehicle 100. In this aspect, removal information 330 includes a removal location field 332 indicating the location of the component on the vehicle (e.g.), a removal type field 334, a removal time field 336 indicating the particular date and time component was removed, a description field 338 comprising a description of the component removed from vehicle 100, a removal reason field 340 describing the reason why the component was removed, and a removal action field 342 describing the particular actions the technician took when removing the component from vehicle 100.

FIG. 3B illustrates an exemplary example of a maintenance record 350. In one aspect, maintenance record 350 stores information regarding the repair and maintenance procedure(s) that are completed on the vehicle. As such, maintenance record 350 can keep track of the failures of, and repairs performed on, the vehicle components. In one aspect of the present disclosure, maintenance record 350 comprises a vehicle identifier field 352, a maintenance type filed 354, a time of maintenance field 356, a complaint description field 358, and an action description field 360 describing the action(s) performed on the vehicle component during maintenance.

FIG. 3C illustrates an exemplary example of a maintenance history record 370. The maintenance history record 370 stores data pertaining to maintenance performed on vehicle 100 over a period of time. In this aspect, maintenance history record 370 includes a vehicle identifier field 372, a record creation date/time field 374, a record expiration date/time field 376, a maintenance description field 378, and a maintenance status field 380 indicating the status of the maintenance performed on the vehicle.

As stated above, aspects of the present disclosure utilize the information and data stored in the maintenance and removal records to predict whether a selected vehicle component should be removed from vehicle 100. In some aspects, aspects of the present disclosure are configured to predict whether the selected vehicle component should be removed within a predetermined timeframe (e.g., within the next month, before the next mileage or flight hour threshold, etc.). As described in more detail below, the prediction is made based on a component removal prediction model whose output indicates whether the selected component should be removed as well as the removal location of the component.

Additionally, embodiments of the present disclosure are configured to utilize this information to determine the location of the selected vehicle component on vehicle 100. As described herein, determining the location of a selected vehicle component is beneficial for creating and using component removal prediction models. Generally, component removal prediction models, such as those generated according to the present disclosure, learn from, and use, the historical data associated with a selected vehicle component to predict whether it should be removed soon. However, data indicating the location of the selected vehicle component is not always readily available. In many cases, data indicating the location of a vehicle component is not explicitly contained in a data record, but rather, is "hidden" or comprised/referred to in other information. That is, the location of a vehicle component on vehicle 100 is not always clear. Without knowing the location of the selected vehicle component, it is difficult to determine whether that vehicle component has already been previously replaced. And without knowing whether the component had been previously replaced, it is difficult to determine when the history of that vehicle component began.

There are a variety of methods by which aspects of the present disclosure extract or obtain the data and information that are used to determine the removal location for a given vehicle component, as well as to generate and use a corresponding component removal prediction model.

Pattern-Based Location Extraction from Text

Pattern-based location extraction is used to determine the location of the selected vehicle components on vehicle 100.

In this aspect, patterns are generated as pattern pairs based on text fields of the removal records 300, as well as the data stored in the maintenance records 350 and the maintenance history records 370. In some aspects, patterns are also generated based on operation records that store data related to the operation of the vehicle components. Such data may be provided, for example, by sensors 208 and includes, but is not limited to, information indicating or related to when the vehicle components are enabled/disabled, when the vehicle components experience mode changes (if at all), warning/failure indicators, and the like.

To extract the removal location from a given text field in a data record (e.g., a maintenance record or a removal record), one aspect of the present disclosure compares a priority list of positive and negative pattern pairs against location information in the removal records 300 and/or the historical data. As defined herein, the positive and negative patterns are regular expression patterns. A "positive pattern" identifies text patterns in which a removal location for a component appears in the location information, and a "negative pattern" identifies text patterns in which the location does not appear in the location information. Additionally, the positive pattern and the negative pattern in a same pair are mutually exclusive, as are the positive patterns for different groups of patterns. However, the positive patterns for different groups are not necessarily exclusive. In some aspects, and ambiguity between the positive patterns of different groups can be resolved by prioritizing the patterns in the groups.

According to the present disclosure, the negative patterns are used to help guard against ambiguous text. For example, the fields in the removal records 300 and/or the maintenance records 350, 370 can sometimes contain ambiguous text regarding an action taken for a vehicle component, such as "Remove Left ACM. Replace Right ACM." In these cases, it cannot be accurately determined whether the given component was the removed Left ACM, or whether the given component was the replaced Right ACM. Therefore, even though the text in a field matches a positive pattern "(Remove/Replace) Left ACM," it is considered ambiguous since it also matches an associated negative pattern "(Remove/Replace) Right ACM," and the present aspects would not utilize the location information associated with these records.

According to this aspect, each positive and negative pattern pair is compared to the location information in the removal records 300 and/or the maintenance records 350, 370 in the order of priority. If the location text in the location information matches the positive pattern and does not match the negative pattern in the pair with the highest priority, the location for the given component is determined to be the location in the text of the location information. Otherwise, the pattern pair with the next priority is tried. This process is repeated until either a pattern pair yields a match or all pattern pairs are exhausted without resulting in a match. If none of the pattern pairs yield a match, then no location can be determined using pattern-based location extraction.

The positive and negative pattern pairs may be derived based on any information needed or desired. In one aspect, though, the positive and negative pattern pairs are regular expression patterns that are derived based on well-known names of the vehicle components and/or installation locations of the vehicle components. Each pattern pair may include a component identifier identifying a selected vehicle component, location information for the selected vehicle component, a first keyword indicating an action to be performed on the selected vehicle component, and a second keyword indicating an action that has already been performed on the selected vehicle component. A list of pattern pairs is then generated and prioritized in preparation for extracting the location of the vehicle component, from text fields of the removal records.

There are multiple ways in which to construct the positive and negative pattern pairs. In one aspect, however, the pattern pairs are constructed as regular expression patterns based on a component identifier, such as a component name. For example, for a Cabin Air Compressor, a phrase abbreviation "CAC" may be used to build a pattern. Alternatively, a word abbreviation (e.g. "Cab Air Cpsr") may be used. In some aspects, combinations of these and/or similar phrases are used to build the patterns. In some cases, the phrase abbreviations can be automatically derived, or manually derived based on industry or commercial standards. Additionally, the word abbreviations can be proposed by an automated process by dropping suffixes or vowels, and/or selected by subject matter experts. In some instances, common misspellings can be considered to ensure that the component identifier is identified in the event of user input error. In another instance, upon pattern generation, a final check can be performed to validate whether the pattern contains common words that are similar to aircraft maintenance practice.

In addition, patterns can be constructed for selected vehicle components based on location information for the selected vehicle components. In one example, numeric indicators are used to identify the locations of vehicle components on a vehicle 100. In some cases, the regular expression patterns for the locations are integers starting from 1. Additionally, the integers may be prefixed by a leading character such as "#", or written as a numeral phrase (e.g., one, two, three, etc.). In another example, text labels or descriptions can be used to identify the vehicle components. For example, text labels such as "forward," "aft," "left," "right," "left hand," and "right hand" may be used to build a regular expression pattern. These text labels can also be abbreviated with "FW" and "FWD" for Forward, "AF" for Aft, "L" for Left, and "RH" or "R/H" for Right Hand. In another example, composite locations can be used to identify the vehicle components, which include the numeric indicator and the text label or description. For example, the composite locations can include "Left 1" or "Right Inboard." Additionally, the portions that comprise the composite regular expression pattern may be separated by whitespace or a special character (e.g., dash or underscore), or notated in any order.

Additionally, patterns can be built for the vehicle components based on a future action to be performed when removing and/or installing the vehicle component and/or on past actions that have been previously performed on the vehicle components. For example, one aspect of the present disclosure uses keywords of a "future tense" that define an action to be performed on a component, such as "remove", "replace", and "deactivate." Other aspects of the present disclosure use keywords of a "past tense" such as "removed", "replaced", and "deactivated." Regardless, these keywords, and others, can be used to build the regular expression patterns comprising the positive and negative patterns. Abbreviations and/or common misspellings of these terms may also be utilized.

Thus, as previously described, each pattern pair in the list of pattern pairs is a regular expression pattern and includes a positive pattern and a negative pattern. The positive pattern and the negative pattern pairs are then prioritized. Any criteria may be used to prioritize the pattern pairs, but in one aspect, the positive and negative pattern pairs are prioritized based on a first keyword indicating an action to be performed on the selected component, a second keyword indicating an action that has already been performed on the selected component, a component identifier, and location information.

Group-Based Location Assignment

In another aspect, group-based location assignment is used to determine the location of selected vehicle components on vehicle 100. In some instances, a group of components 116 (e.g., a group of vehicle components on the same side of vehicle 100, in a same area on vehicle 100, in a same compartment of vehicle 100, on a same panel or subsystem of vehicle 100, etc.) can or should be removed or installed at the same time. Each component in the group of components would have its own corresponding removal record. Often times, however, the text descriptions in the removal records for these group components do not distinguish between the components in the group. Accordingly, the present aspects generate patterns to identify groups of removal records so that a distinct location can be assigned to each record in the same group.

Accordingly, for each text field in a plurality of removal records, one aspect of the present disclosure generates a list of regular expression patterns to identify groups of removal records. The groups of removal records can be identified based on whether the text fields in those records match the regular expression pattern with which it is associated. Each pattern in the list of patterns can be associated with a list of target locations. The target locations may be defined by an operator, or by an autonomous process. In this latter aspect, an autonomous process may determine whether components within a given location should be removed or replaced based on a predetermined set of rules. Regardless, however, upon determining that the removal records 300 match a pattern in the list of patterns, each removal record 300 can be assigned a distinct location from the list of target locations associated with the matching pattern.

For example, consider a text field that states "Replace all CACs." In this case, because of the word "all" and/or because of the language making the CAC plural (i.e., 's'), it can be assumed that there are a plurality of CACs on the vehicle 100. Therefore, the record associated with this text field may be part of a group of removal records for the CACs. In these cases, the present aspects can use this phrase as a pattern (i.e., a regular expression pattern) to identify other removal records in the group.

As another example, consider a text field comprising the text "Inboard and Outboard CAC on the Right side." In this case, this text may identify a group of two removal records (i.e., the Inboard and Outboard CAC components) located on the right side of the vehicle. Further, because the components are known, their particular locations on the right side of the vehicle (e.g., R1 and R2) would also be derivable.

Additionally, according to the present aspects, groups of removal records 300 can also be identified based on time, as determined by a timestamp associated with each removal record. For example, consider an instance where a plurality of removal records for the vehicle have a timestamp that falls within a predetermined time window. This could indicate that the components associated with the removal records 300 were all removed about the same time. In these cases, the removal records 300 for these components could be grouped and assigned a label indicating a distinct location on vehicle 100 for each record in the group as being associated with the same pattern.

Location Extraction from Maintenance Records

In another aspect, a location of a component on vehicle 100 may be extracted from maintenance records 350, 370. In more detail, it is not always easy to reliably link the maintenance records 350, 370 to associated removal records 300. This can be at least partially due to the formatting of the information in these records. To mitigate these situations, aspects of the present disclosure utilize an identifier for the vehicle 100 as well as the removal dates of the components removed from vehicle 100 to identify a set of candidate maintenance records from the maintenance records 350, 370. More specifically, the present disclosure defines a time window and determines the removal records 300 having a timestamp within that time window. All maintenance records 350, 370 for vehicle 100 that fall within the predetermined time window are considered candidate maintenance records and further processed.

Particularly, the present aspects first generate the candidate maintenance records by filtering the candidate maintenance records. To filter the candidate records, one aspect of the present disclosure determines whether the text of a candidate maintenance record includes a serial number for a component that has been removed from the vehicle. Such serial numbers often have a "leading" pattern like "OFF S/N" or "Remove". Candidate maintenance records having such a leading pattern indicate, with high confidence, that the candidate maintenance record is associated with a component having a removal record. Once the candidate maintenance records have been filtered, aspects of the present disclosure use the pattern-based location extraction methods previously described to identify a location of a vehicle component in a first candidate record (i.e., in the order of removal time).

When no location can be determined from the filtered candidate maintenance records, aspects of the present disclosure modify the filtering condition to match a part number or name of the component and generate a second set of candidate maintenance records. Such may be accomplished by matching the component sub-pattern as described above. The present aspects may then use the previously described pattern-based location extraction methods to identify the locations in the second set of candidate maintenance records.

Location Extraction from Removal Requests

In another aspect of the present disclosure, a location of a selected vehicle component on vehicle 100 may be extracted from removal requests identified in the set of candidate maintenance and operational records. In some situations, it is difficult to reliably link a component that is to be removed from vehicle 100 to one or more removal records 300 associated with the same or similar type of components previously removed from vehicle 100. The present aspects address these situations by first identifying a set of candidate maintenance records based on a vehicle identifier and a removal date for the same or similar types of components previously removed. So identified, the present aspects define a time window around the removal records 300 and use the information in the constrained set of removal records to identify all maintenance records 350, 370 for the vehicle.

The set of candidate maintenance records is then filtered using the pattern-based extraction methods previously described to identify the removal location associated with the first candidate maintenance record (i.e., in the order of removal time).

FIG. 3D is a flow diagram illustrating a method 390 for determining the location of a selected vehicle component on vehicle 100 according to one aspect of the present disclosure. As seen in FIG. 3D, method 390 first loads the removal records 300 from a DB 204 (box 391). The records may be loaded, for example, based on a particular operator, vehicle, vehicle model and/or sub-model. Then, for each removal record 300, method 390 determines the location of a selected component on vehicle 100 using pattern-based location extraction, as previously described (box 392). In one aspect, the location of the selected vehicle component is determined using a set of regular expression patterns associated with an operator, vehicle, vehicle model and/or sub-model, or component.

If the location of the selected vehicle component cannot be determined, method 390 extracts the location from a text field, such as a component description field 338, a removal reason field 340, and/or a removal action field 342 using the pattern-based location extraction technique and the set of regular expression patterns, as previously described (box 393). For all removal records 300 in which a location of the selected vehicle component still cannot be determined, method 390 identifies a group of removal records for the selected component using the group pattern-based location extraction, and assigns a unique location to each removal record in the group, as previously described (box 394).

If a location of the selected vehicle component still cannot be determined, aspects of the present disclosure determine a list of candidate maintenance records and extract the location of the selected vehicle component from the maintenance records 350, 370 using the location extraction from maintenance records technique, as previously described (box 395). In the event that the location of the selected vehicle component still cannot be determined, aspects of the present disclosure determine a list of candidate removal requests associated with the removal of the same or similar vehicle components and extracts a location for the selected vehicle component from that list of candidate removal requests using the location extraction from removal requests technique, as previously described (box 396).

Finally, for each removal record 300, aspects of the present disclosure update the corresponding location using one or more supplementary files (box 397). In one aspect, the one or more supplementary files comprise data and information associated with previous removals of one or more vehicle components. Such data can also be used to determine the location of the selected vehicle component for cases where the location cannot be determined using the above-described techniques.

FIG. 4 is a flow diagram illustrating a method 400 for predicting when a component currently installed on a vehicle should be removed. As seen in FIG. 4, method 400 first obtains a plurality of maintenance records for a vehicle 100 (e.g. an aircraft) (box 402). The maintenance records comprise information associated with maintenance performed on vehicle components currently installed on the vehicle or previously removed from the vehicle. In some aspects, the information also comprises sensor readings captured during the operation of the components. As stated above, the sensor reading may be obtained from operational records stored in DB 204. Method 400 then obtains a plurality of removal records 300 for vehicle 100 (box 404).

The removal records 300 comprise removal information associated with vehicle components previously removed from the vehicle.

Once the maintenance records 350, 370 and the removal records 300 have been obtained, a location of a selected vehicle component on the vehicle can be determined (box 406). The location identifies a location and/or a position of the selected vehicle component on vehicle 100. A component removal prediction model is then generated based on the maintenance records 350, 370 and the removal records 300 for vehicle (box 408). The component removal prediction model is then used to predict whether the selected vehicle component is to be removed from vehicle 100 (box 410).

Responsive to determining that the selected vehicle component is to be removed, method 400 generates a graphical user interface (GUI) 214 (box 412) and outputs the GUI 214 to a display for a user (box 414). The GUI 214 in this aspect is generated to include a visual representation graphically representing vehicle 100, the selected vehicle component, the location of the selected vehicle component on vehicle 100, and a reference (e.g., one or more hyperlinks) to a section(s) in a vehicle maintenance manual associated with a process(es) for removing/replacing the selected vehicle component.

Figure 5:
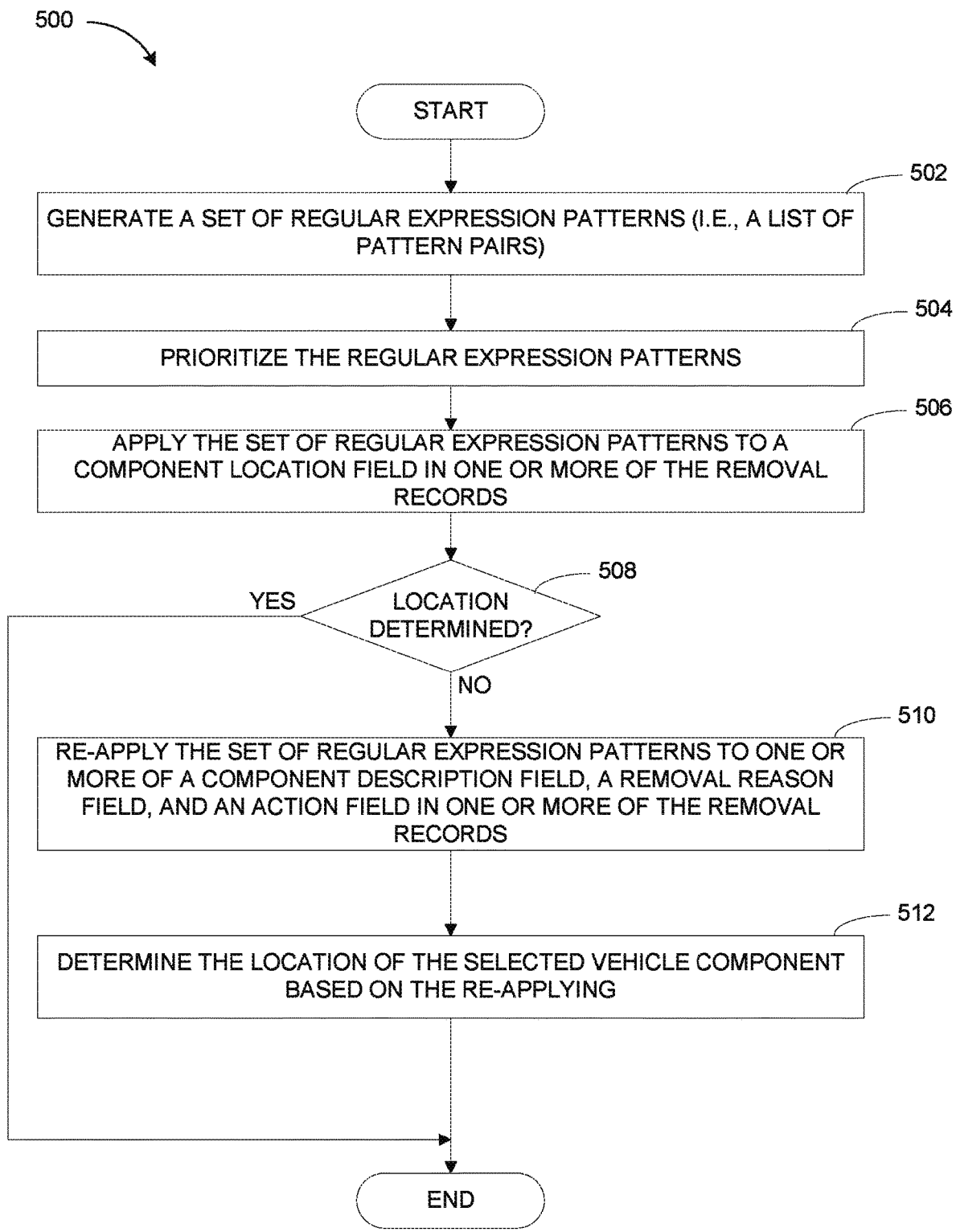

FIG. 5 is a flow diagram illustrating a method 500 for determining a location of a component currently installed on a vehicle 100 according to one aspect of the present disclosure. As seen in FIG. 5, method 500 first generates a set of regular expression pattern pairs based on the removal records 300 and the maintenance records 350, 370 (box 502). For example, in one aspect, the regular expression patterns may be generated on information that may include, but is not limited to, the operator (e.g., the organization such as an airline or other maintenance organization) that performed the maintenance on the vehicle, a model and/or sub-model of the vehicle, and data associated with the selected vehicle component (e.g., component type, etc.). In this aspect, each pattern pair comprises a component identifier identifying the selected vehicle component, location information for the selected vehicle component, a first keyword indicating an action to be performed on the selected vehicle component, and a second keyword indicating an action that has already been performed on the selected vehicle component. The list of patterns generated is then prioritized (box 504). In one aspect, the list of pattern pairs are prioritized based on the first keyword, the second keyword, the component identifier, and the location information. Method 500 then applies the pattern pairs to a component location field in one or more of the removal records 300 to extract the location of the selected vehicle component (box 506). If the location is determined, the method 500 can end.

In some cases, however, the location of the selected vehicle component may not have been successfully determined. In these cases (box 508), method 500 re-applies the set of regular expression pattern pairs to other fields in the removal records 300. Such fields include, but are not limited to, the component description field, the removal reason field, and one or more of the action fields (box 510). In one aspect, the list of pattern pairs is re-prioritized for each such field. The method 500 then determines the location of the selected vehicle component based on the reapplication of the regular expression pattern pairs to the other fields (box 512). For example, in one aspect, method 500 extracts the location of the selected vehicle component responsive to determining that a positive pattern matches the location information in a given removal record 300 and that a corresponding negative pattern does not match the location information in removal record 300.

Figure 6:
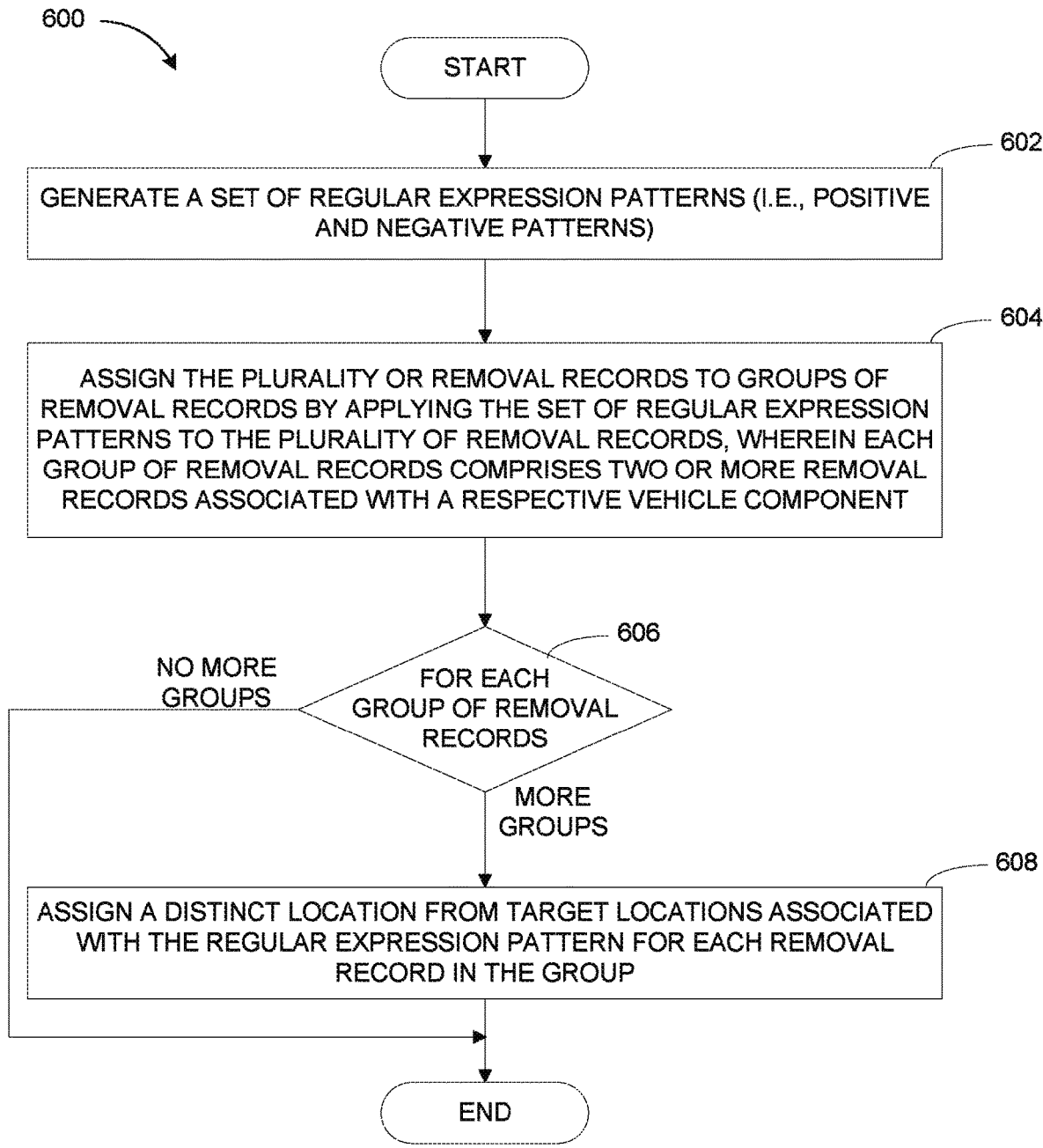

FIG. 6 is a flow diagram illustrating a method 600 for determining the location of the selected vehicle component on vehicle 100 according to one aspect of the present disclosure. Method 600 may be implemented as a standalone procedure, for example, or it may be implemented whenever the location cannot be determined using the process of method 500.

As seen in FIG. 6, method 600 first generates a set of regular patterns to identify groups of removal records 300 from the plurality of removal records 300 for vehicle 100 (box 602). In one aspect, the patterns are generated based on one or more of a vehicle component identifier, a removal reason description, a removal action description, a removal timestamp, and a subset of two or more target locations on the vehicle.

Method 600 then applies the regular expression patterns to the removal records 300. In this aspect, each regular expression pattern in the list of patterns identifies a group of two or more removal records 300 from the plurality of removal records 300 for a subset of two or more target locations. These two or more removal records are assigned to a corresponding group of removal records (box 604). A distinct location from the two or more target locations is then determined for each vehicle component in the corresponding groups of removal records. For example, method 600 processes each group of removal records that was generated. In one aspect, for each group of removal records 300 (box 606), method 600 assigns a distinct location from target locations associated with the regular expression pattern for each removal record in the group (box 608). For example, for each group of removal records (e.g., Left-side CACs for two records in the same group), each record in the group is assigned a distinct respective location (e.g., L1 for one record and L2 for the other record). Here locations "L1" and "L2" are target locations defined together with the group pattern. In one aspect, the number of target locations matches the number of removal records in each group of records. Regardless, method 600 continues processing each group of removal records until there are no more groups to process.

The removal records in a given group are related. For example, the removal records in a given group may be at or near the same location on vehicle 100, or they may relate to the same/similar components, or they may have been removed at or near the same time. For example, in this aspect, each of the plurality of removal records for vehicle 100 comprises a timestamp. Further, the timestamp for each of the two or more removal records in a group of removal records falls within a predetermined time window. Thus, the removal records in the groups of removal records are for components that were previously removed within a particular time period.

As another example, assigning the two or more removal records to a corresponding group of removal records may be based on one or more of a vehicle component identifier, a removal reason description, a removal action description, and/or a subset of target locations for a vehicle component on vehicle 100. In another aspect, assigning the two or more removal records to a corresponding group of removal records is performed responsive to determining that a total number of removal records in the group matches a number of target locations associated with the pattern.

Figure 7A:
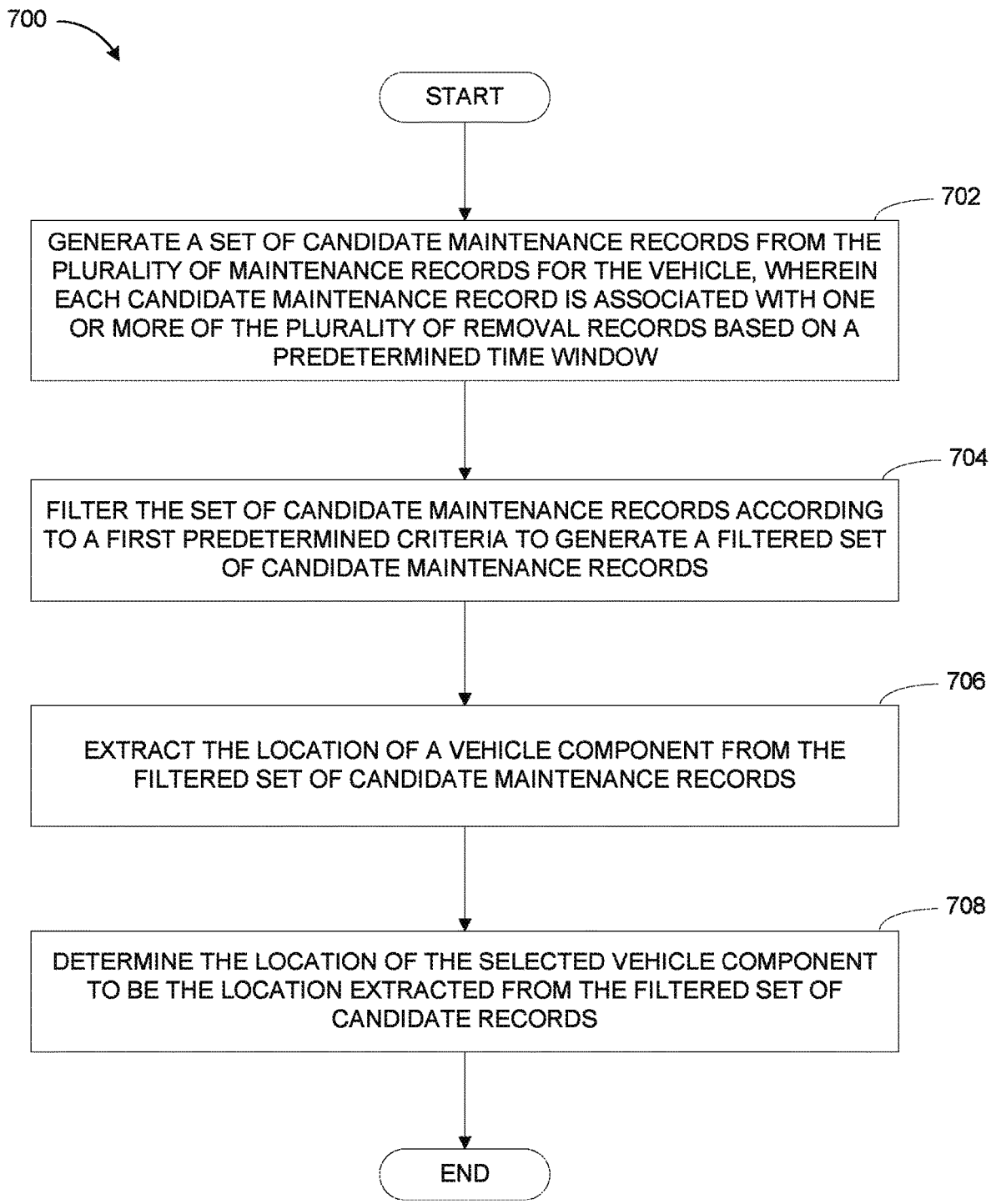

FIGS. 7A-7D are flow diagrams illustrating methods for determining the location of a selected vehicle component currently installed on vehicle 100 according to aspects of the present disclosure. Referring to FIG. 7A, method 700 first generates a set of candidate maintenance records from the plurality of maintenance records 350, 370 for vehicle 100 (box 702). Each candidate maintenance record is associated with one or more removal records 300 based on a predetermined time window. That is, the timestamps in each of the maintenance records 350, 370 and the removal records 300 all fall within the predetermined time window. In some aspects, generating the set of candidate maintenance records also considers the data and information associated with one or more operational records associated with the vehicle 100 and/or the vehicle components. Regardless, however, the timestamp information associated with the operational records also falls within the predetermined time window. Thus, the operational records are also associated with the removal records 300 and the maintenance records 350, 370.

The set of candidate maintenance records is then filtered according to a first predetermined criteria to generate a filtered set of candidate maintenance records (box 704). In one aspect, the first predetermined criteria comprises a pattern, such as a regular expression pattern, for example, representing an action performed on the selected vehicle component. Method 700 then extracts a location of a vehicle component from the filtered set of candidate maintenance records (box 706). The location of the selected vehicle component is then set to be the location extracted from the filtered set of candidate records (box 708).

Figure 7B:
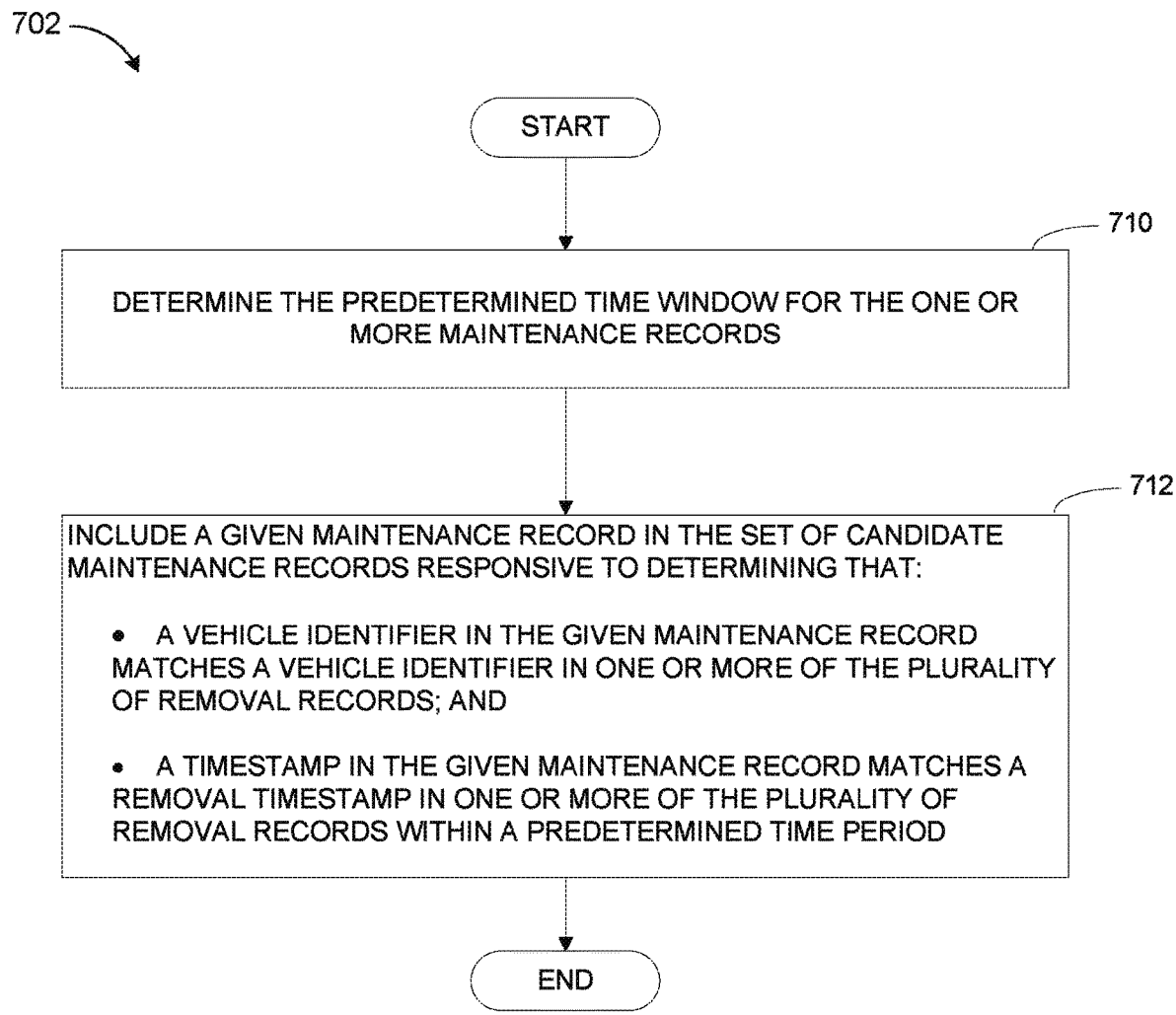

FIG. 7B illustrates a method for generating the set of candidate maintenance records (box 702) in more detail according to one aspect. As seen in FIG. 7B, the predetermined time window for the removal records and maintenance records is first determined (box 710). Whether a given maintenance record is to be included in the set of candidate maintenance records is then determined (box 712). In this aspect, determining whether a given maintenance record is to be included in the set of candidate maintenance records is based on:

whether a vehicle identifier in the given maintenance record matches a vehicle identifier in the one or more removal records; and/or whether a removal date in a given maintenance record matches a removal date in one or more removal records; and/or whether a timestamp in the given maintenance record falls within the same predetermined time window as do one or more removal records. That is, the timestamp in the given maintenance record matches a removal timestamp in one or more of the plurality of removal records within a predetermined time period.

Figure 7C:
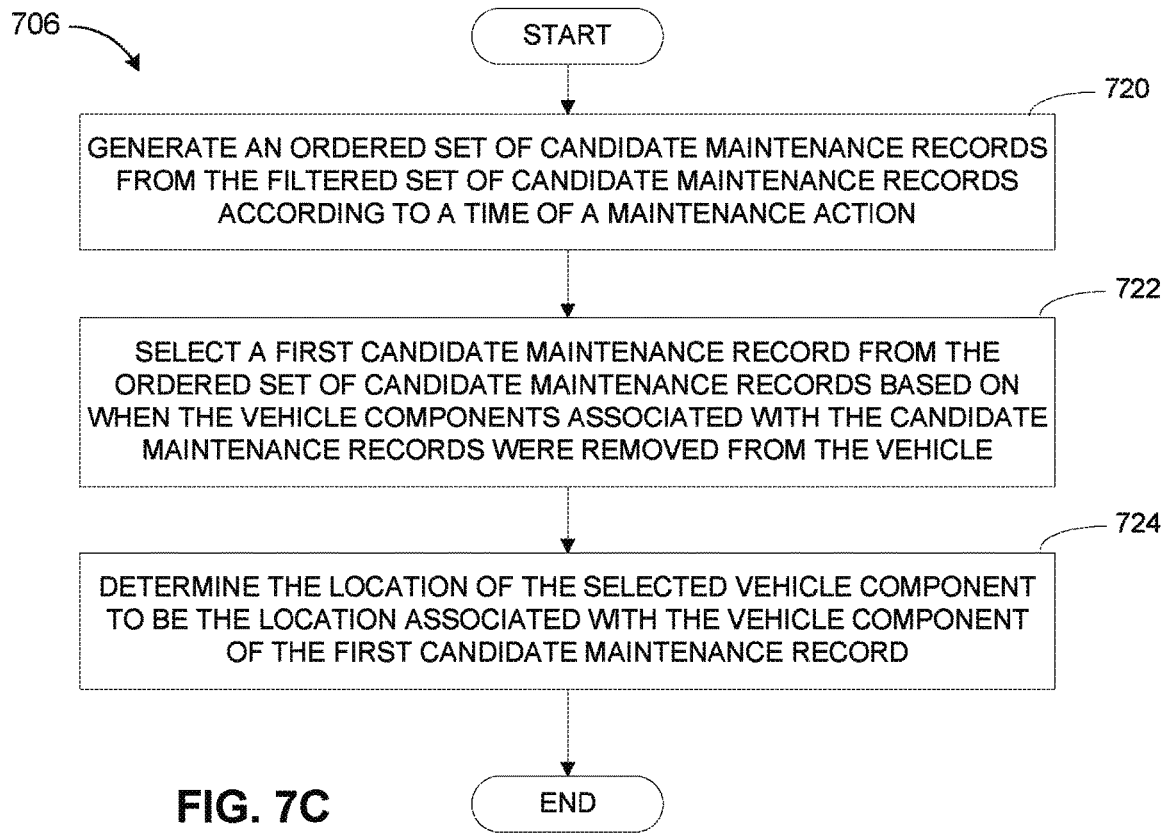

FIG. 7C illustrates a method for extracting the location from the filtered set of candidate maintenance records (box 706). As seen in this aspect, the filtered set of candidate maintenance records is first ordered (box 720). The filtered set of candidate maintenance records may, for example, be ordered according to a time of a maintenance action. A first candidate maintenance record is then selected from the ordered set of candidate maintenance records (box 722). The selection may be based, for example, on when the vehicle components associated with the ordered set of candidate maintenance records were removed from vehicle 100 (box 722). Once selected, the location of the selected vehicle component is determined to be the location associated with the vehicle component of the first candidate maintenance record (box 724).

Figure 7D:
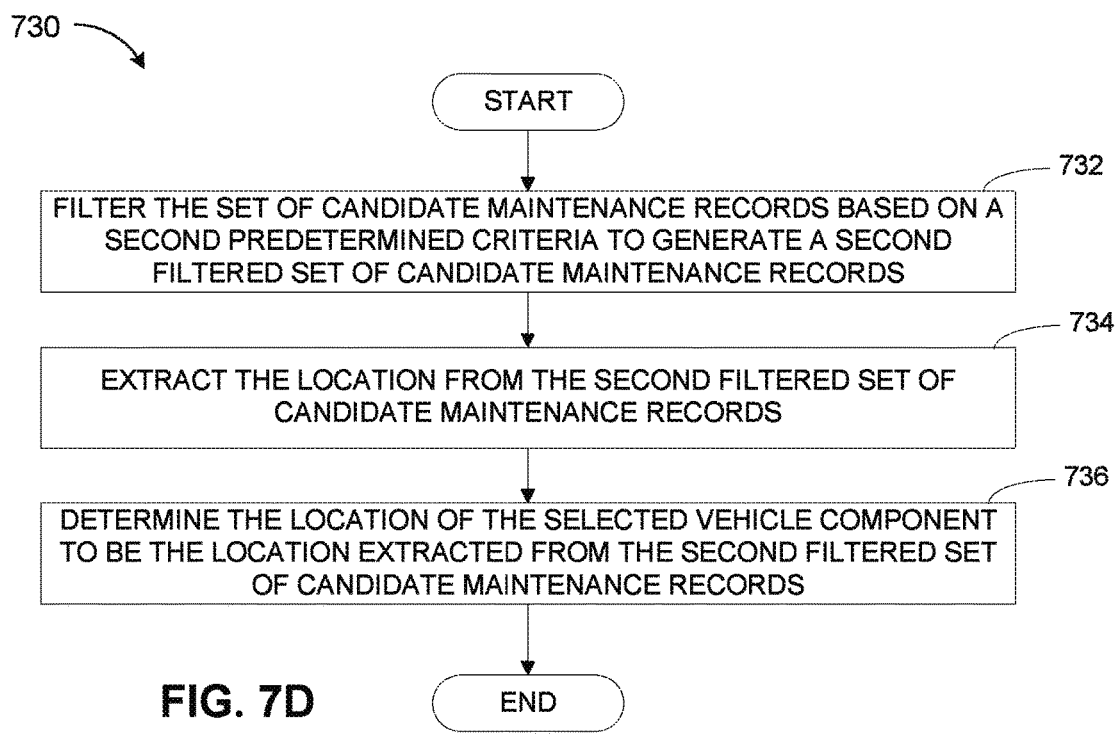

FIG. 7D illustrates a method 730 for determining a location for the selected vehicle components in situations where that location was not extracted from the filtered set of candidate maintenance records. As seen in FIG. 7D, method 730 first filters the set of candidate maintenance records based on a second predetermined criteria to generate a second filtered set of candidate maintenance records (box 732). In this aspect, the second predetermined criteria may, for example, identify a maintenance action and/or a time of the maintenance action. A first candidate maintenance record is then selected from the second filtered set of candidate maintenance records based on when the vehicle component associated with that candidate maintenance record was removed from the vehicle (box 734). The location for the selected vehicle component is then determined to be the location associated with the first candidate maintenance record (box 736).

Figure 8:
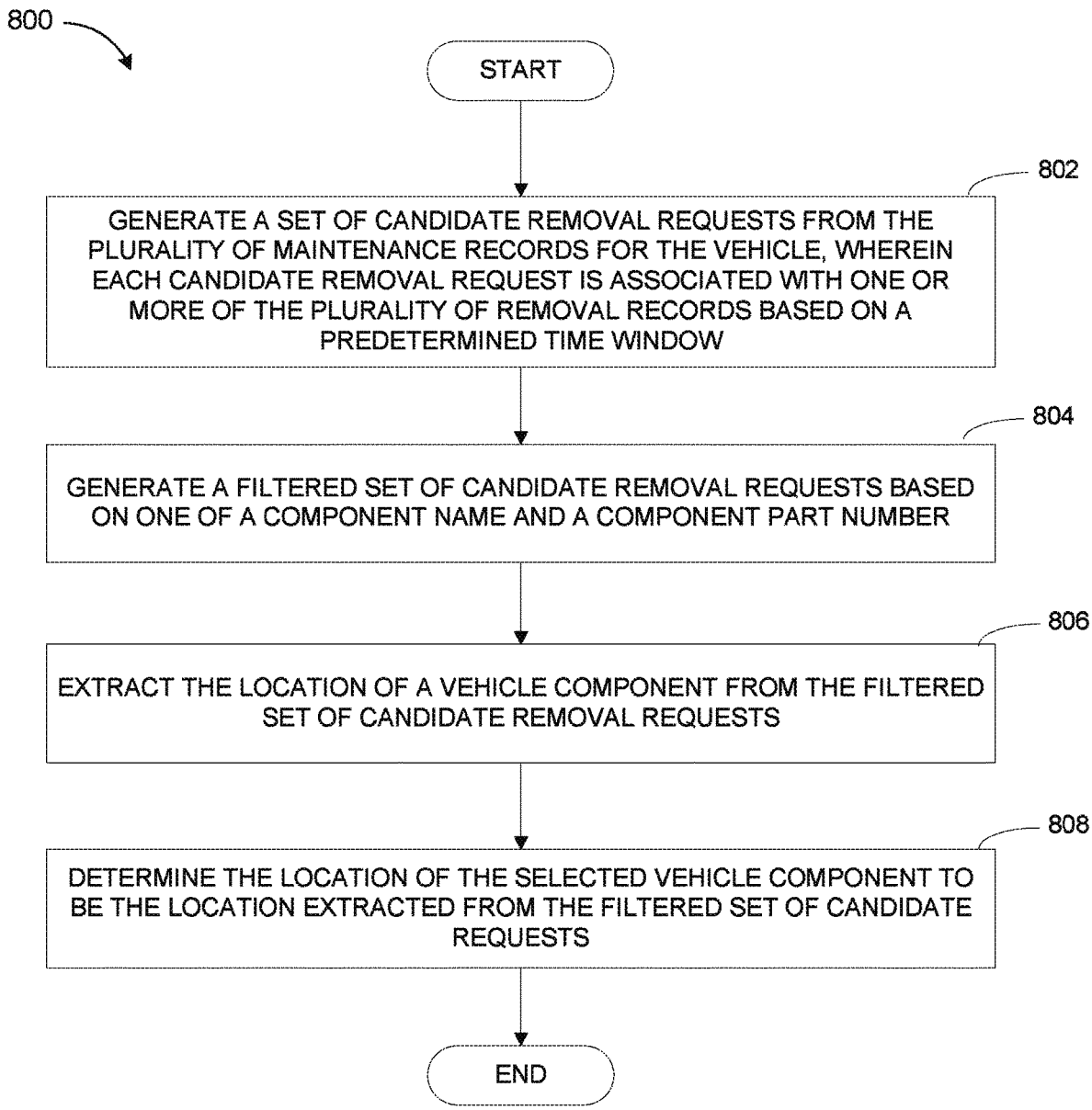

FIG. 8 is a flow diagram illustrating a method 800 for determining a location for a selected vehicle component currently installed on vehicle 100 according to one aspect of the present disclosure. Method 800 first generates a set of candidate removal requests from the plurality of maintenance records 350, 370 for vehicle 100 (box 802). Each candidate removal request is associated with one or more removal records 300 based on a predetermined time window. Method 800 then generates a filtered set of candidate removal requests based on an indicator indicating one of a component name and a component part number (box 804). The location is then extracted from the filtered set of candidate removal requests (box 806) and set to be the location of the selected vehicle component (box 808).

FIG. 9 is a flow diagram illustrating a method 900 for generating a graphical user interface (GUI) 214 according to one aspect of the present disclosure. In this aspect, the GUI is generated responsive to determining that the selected vehicle component is to be removed and to include a visual representation of a vehicle 100. In this aspect, the visual representation of vehicle 100 is generated to include the selected vehicle component, the location of the selected vehicle component on vehicle 100, and one or more references to section(s) in a vehicle maintenance manual related to the process(es) of removing and/or replacing the selected vehicle component (box 902). The visual representation is then output to the graphical user interface 214 for display to the user (box 904).

FIG. 10 is a schematic block diagram illustrating an example computing device 210 configured to implement the previously described methods according to one or more aspects of the present disclosure. In this aspect, computing device 210 comprises processing circuitry 1000 communicatively coupled to a memory 1002 that stores one or more control programs 1004, and communication circuitry 1006.

According to various aspects of the present disclosure, processing circuitry 1000 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one such aspect, processing circuitry 1000 includes programmable hardware capable of executing software instructions stored, e.g., as a machine-readable computer control program 1004 in memory 1002.

More particularly, processing circuitry 1000 is configured to obtain a plurality of maintenance records for a vehicle and a plurality of removal records for the vehicle, as previously described. Based on that information, processing circuitry is configured to determine a location of a selected vehicle component on the vehicle, and to generate a component removal prediction model. Additionally, processing circuitry is further configured to predict whether the selected vehicle component is to be removed from the vehicle, and if so, generate a visual representation of vehicle 100, as previously described. The visual representation is then output to a graphical user interface 214 for display to a user, as previously described.

Memory 1002 comprises any non-transitory machine-readable storage media known in the art or that may be developed, whether volatile or non-volatile, including (but not limited to) solid-state media (e.g., SRAM, DRAM, DDRAM, ROM, PROM, EPROM, flash memory, solid-state drive, etc.), removable storage devices (e.g., Secure Digital (SD) card, miniSD card, microSD card, memory stick, thumb drive, USB flash drive, ROM cartridge, Universal Media Disc), fixed drive (e.g., magnetic hard disk drive), or the like, individually or in any combination. As seen in FIG. 10, memory 1002 comprises, in at least one aspect, the control program 1004 that, when executed by processing circuitry 1000, causes computing device 210 to implement one or more of the methods previously described.

Communications circuitry 1006 comprises circuitry configured to control the input and output (I/O) data paths of the computing device 210. The I/O data paths include data paths for exchanging signals with other computers and mass storage devices over a communications network (not shown). Such signals include, but are not limited to, those that are needed to obtain the historical data for vehicle components, previously described, from a storage location that is external to computing device 210. Such storage locations include, for example, databases. In some aspects, communications circuitry 1006 comprises an ETHERNET card configured to communicate signals and data with one or more remote devices via one or more communications networks (not shown).

Although not illustrated in the figure, computing device 210 may, as is known in the art, further comprise one or more User Input/Output (I/O) devices. These I/O devices may comprise any device known in the art that allows a user to interact with the computing device 210. Such I/O devices can include but are not limited to, microphones, speakers, display devices (such as a Liquid Crystal Display (LCD) and/or a Light Emitting Diode (LED) display for presenting visual information to a user), keyboards, keypads, a pointer device, such as a mouse, and the like.

FIG. 11 is a functional block diagram illustrating a computer program product according to one aspect of the present disclosure. Accordingly, FIG. 11 illustrates processing circuitry 1000 implemented according to different hardware units and software modules (e.g., as control program 1004 stored in memory 1002) according to one aspect of the present disclosure. As seen in FIG. 11, processing circuitry 1000 implements a maintenance records obtaining unit/module 1100, a removal records obtaining unit/module 1102, a location determining unit/module 1104, a component removal prediction generating unit/module 1106, and a visual representation generating unit/module 1108, and an outputting unit/module 1110.

The maintenance records obtaining unit/module 1100 comprises instructions that, when executed by processing circuitry 1000, configures computing device 210 to obtain maintenance records for vehicle 100 and/or for vehicle components installed on the vehicle 100. In some aspects, the maintenance records obtaining unit/module 1100 comprises instructions that, when executed by processing circuitry 1000, configures computing device 210 to obtain operational records, as previously described. In some aspects, the operational records can include data and information associated with the operation of vehicle 100 and/or the vehicle components. Such data and information may, as previously described, be monitored and collected by a variety of sensors distributed throughout vehicle 100.

The removal records obtaining unit/module 1102 comprises instructions that, when executed by processing circuitry 1000, configures computing device 210 to obtain a plurality of removal records 300 for the vehicle 100, as previously described. The obtained removal records include data that is associated with the removal of the vehicle components from the vehicle. The removal records can include information related to the vehicle, information about component, and information related to the removal of the component from vehicle 100.

The location determining unit/module 1104 comprises instructions that, when executed by processing circuitry 1000, configures computing device 210 to determine a location for a selected vehicle component currently installed on the vehicle. This determination is made based on the removal records and the maintenance records obtained by the maintenance records obtaining unit/module 1100 and the removal records obtaining unit/module 1102, as previously described. The location that is determined indicates the location on vehicle 100 from which the selected vehicle component was removed.

The component removal prediction unit/module 1106 comprises instructions that, when executed by processing circuitry 1000, configures computing device 210 to generate a component removal prediction model based on the maintenance records and the removal records for vehicle 100. The removal records allow the processing circuitry 1000 of computing device 210 to predict whether a selected vehicle component is to be removed from the vehicle. Additionally, in at least one aspect, the component removal prediction unit/module 1106 comprises instructions that, when executed by processing circuitry 1000, configures computing device 210 to determine the location for the selected vehicle component on vehicle 100, as previously described.

The visual representation generating unit/module 1108 comprises instructions that, when executed by processing circuitry 1000, configures computing device 210 to generate a visual representation of the vehicle responsive to the prediction that the selected vehicle component is to be removed from vehicle 100, as previously stated. The visual representation graphically represents the vehicle, the selected vehicle component, the location of the selected vehicle component on the vehicle, and a reference or references to a section or sections in one or more vehicle maintenance manuals related to the removal and/or replacement of the selected vehicle component.

The outputting unit/module 1110 comprises instructions that, when executed by processing circuitry 1000, configures computing device 210 to output the visual representation to a graphical user interface 214 for display by a user.

As stated previously, aspects of the present disclosure may be utilized to predict whether a component currently installed on a vehicle 100 should be removed, and if so, determine its particular location on vehicle 100. In the previously described aspects, vehicle 100 is an aircraft. However, an aircraft is not the only type of vehicle suitable for use with the present aspects. As seen in FIG. 12, for example, aspects of the present disclosure may also be utilized to predict whether components should be removed from spacecraft 1200, automobiles that utilize fossil fuels 1202, rotorcraft 1204 such as helicopters, surface craft 1206 such as boats, and submersible craft 1208 such as submarines. Additionally, as previously described, these aspects would also determine the location of a component that is to be removed.

As stated previously, aspects of the present disclosure output a GUI 214 to a display. The GUI 214 may comprise, for example, a graphical visual representation of the vehicle, the selected vehicle component, the location of the selected vehicle component on the vehicle, and a reference to a section in a vehicle maintenance manual associated with a procedure for replacing and/or removing the selected vehicle component from the vehicle. According to aspects of the present disclosure, a person, such a maintenance technician, for example, can review the information output on GUI 214. Based on that information, the maintenance technician or other person can remove or replace the selected component.

Additionally, while the present disclosure illustrates outputting a GUI 214 graphically providing information used to replace and/or remove a selected vehicle component, the present disclosure is not so limited. More particularly, the data associated with the component removal prediction model may be provided to a user, such as a maintenance technician, in other ways in addition to, or in lieu of, GUI 214. By way of example only, aspects of the present disclosure are configured to generate a notification and communicate that notification to the maintenance technician via email or text message. The notification could inform the maintenance technician that the selected vehicle component is to be removed and/or replaced, as well as provide the recommendation and other information output to GUI 214. In response to receiving the notification, the maintenance technician would perform the process(es) to remove or replace the selected vehicle component based on the received information. In one aspect, the maintenance technician could consult GUI 214 responsive to receiving the communication.

In another aspect, the present disclosure communicatively connects computing device 210 to an existing inventory system. In these aspects, computing device 210 generates a control message identifying the selected vehicle component and sends the message to the inventory system. Responsive to receiving the control message, the inventory system automatically obtains a replacement component for the selected vehicle component, and pre-positions or moves the replacement component to a designated area to be installed on vehicle 100. So positioned, a maintenance technician or other personnel may retrieve the replacement component and use it to replace the selected vehicle component once it has been removed from vehicle 100.

In one aspect, the control message is generated and sent automatically by computing device 214 to the inventory system. In other aspects, however, the maintenance technician or other user reviewing the information output by GUI 214 controls computing device 210 to send the control message to the inventory system. For example, in one aspect, the maintenance technician explicitly selects a hyperlink or other software-based control on GUI 214. Selecting the hyperlink or other control on GUI 214 causes computing device 210 to generate the control message identifying the selected vehicle component and send the control message to the inventory system. Upon receipt of the control message, the inventory system automatically obtains the replacement component and pre-positions or moves the replacement component to the designated area. In one aspect, computing device 210 sends the control message as an email message to inventory system. In these aspects, the email message could include a formatted message body, for example, identifying the selected vehicle component and/or comprising one or more control sequences indicating the designated area in which the inventory system is to pre-position or move the replacement component.

Regardless of the particular aspect, however, the present disclosure allows maintenance technicians and/or other personnel to quickly and easily implement the predicted/recommended removal/replacement of the selected vehicle component.

Aspects of the present disclosure further include various methods and processes, as described herein, implemented using various hardware configurations configured in ways that vary in certain details from the broad descriptions given above. For instance, the previous aspects of the present disclosure have been described in terms of a single computing device 210. However, those of ordinary skill in the art should readily appreciate that this is for illustrative purposes and ease of discussion only. Aspects of the present disclosure are not limited to operation on a single machine, but instead, such operation may be distributed across multiple computing devices 210.

For example, aspects of the present disclosure may be implemented, partially or entirely, using a neural network. Neural networks, as is known in the art, comprise algorithms that are specially configured to recognize the relationships that exist between data. These algorithms may be executed on a single computing device 210 but are typically executed on a plurality of computing devices 210. Recognition of the relationships is based on information that is "learned" by the neural network over time and in many iterations.

In the context of the present disclosure, the neural network comprises one or more computing devices 210. Each computing device 210 is trained over time to determine a removal location for a vehicle component (e.g., components 112, 114, 116, 118) based on utilizing a location labeling process using multiple data sources such as DBs 204, user input terminal 206, sensors 208, as well as those described above (e.g., methods 390, 400, 500, 600, 700, 730, 800, and 900). Particularly, the computing devices 210 in the neural network may be configured to obtain maintenance records and/or operational records for vehicle components installed on the vehicle, including information associated with the maintenance of the vehicle components, as previously described. The computing devices 210 are also configured to obtain a plurality of removal records for the vehicle, which includes data associated with the removal of the vehicle components. The computing devices 210 are also configured to determine, based on the removal records and the maintenance records, a location for a selected vehicle component currently installed on the vehicle. The computing devices 210 are also configured to predict whether the selected vehicle component is to be removed from the vehicle based on the maintenance records and the removal records associated with the selected vehicle component. The computing devices 210 are further configured to generate a visual representation of the vehicle that is output to a graphical user interface 214 for display to a user.

Additionally, it should be noted by those of ordinary skill in the art that depending on, e.g., the design and cost tradeoffs for various approaches and/or system-level requirements, one or more of the processing functionalities discussed above may be implemented using dedicated hardware rather than a microprocessor configured with program instructions.

The present aspects may, of course, be carried out in other ways than those specifically set forth herein without departing from essential characteristics of the present disclosure. The present aspects are therefore to be considered in all respects as illustrative and not restrictive, and all changes coming within the meaning and equivalency range of the appended claims are intended to be embraced therein.

What is claimed is:

1. A computing device comprising:
processing circuitry; and
memory comprising instructions executable by the processing circuitry whereby the computing device is configured to:
  obtain a plurality of maintenance records for a vehicle, wherein the plurality of maintenance records comprise maintenance information associated with maintenance performed on vehicle components currently installed on the vehicle or previously removed from the vehicle;
  obtain a plurality of removal records for the vehicle, wherein the plurality of removal records comprise removal information associated with vehicle components previously removed from the vehicle;
  determine, based on the plurality of maintenance records and on the plurality of removal records, a location of a selected vehicle component on the vehicle;
  generate a component removal prediction model based on the plurality of maintenance records and the plurality of removal records for the vehicle;
  predict, based on the component removal prediction model, whether the selected vehicle component is to be removed from the vehicle; and
  responsive to determining that the selected vehicle component is to be removed, generate a graphical user interface for display to a user by:
    generating a visual representation of the vehicle for display in a first area of the graphical user interface, wherein the visual representation of the vehicle graphically represents the vehicle, the selected vehicle component, and the location of the selected vehicle component on the vehicle;
    generating one or more graphical indicators for display in a second area of the graphical user interface, wherein the one or more graphical indicators comprise information configured to visualize removal of the selected vehicle component for the user; and
    generating a hyperlink for display in a third area of the graphical user interface, wherein the hyperlink links to a section in a vehicle maintenance manual associated with a procedure for removing the selected vehicle component from the vehicle; and
  output the visual representation of the vehicle, the one or more graphical indicators, and the hyperlink to the graphical user interface for display to the user by:
    outputting the visual representation of the vehicle to the first area of the graphical user interface;
    outputting the one or more graphical indicators to the second area of the graphical user interface; and
    outputting the hyperlink to the third area of the graphical user interface.

2. The computing device of claim 1 wherein the processing circuitry is configured to generate a set of regular expression patterns based on one or more of:
an operator associated with maintenance of the vehicle;
a model of the vehicle;
a sub-model of the vehicle; and
data associated with the selected vehicle component.

3. The computing device of claim 2 wherein to determine the location of the selected vehicle component on the vehicle, the processing circuitry is configured to apply the set of regular expression patterns to a component location field in one or more of the removal records.

4. The computing device of claim 3 wherein when the location of the selected vehicle component is not determined, the processing circuitry is further configured to:
re-apply the set of regular expression patterns to one or more of a component description field, a removal reason field, and an action field in one or more of the removal records; and
determine the location of the selected vehicle component based on the re-applying.

5. The computing device of claim 1 wherein the processing circuitry is configured to generate a set of regular expression patterns based on one or more of:
a vehicle component identifier;
a removal reason description;
a removal action description;
a removal timestamp; and
a subset of one or more target locations for the selected vehicle component on the vehicle.

6. The computing device of claim 5 wherein to determine the location of the selected vehicle component on the vehicle, the processing circuitry is configured to:
assign the plurality or removal records to groups of removal records by applying the set of regular expression patterns to the plurality of removal records, wherein each group of removal records comprises two or more removal records associated with a respective vehicle component; and
for each group of removal records, assign a distinct location from target locations associated with the regular expression patterns for each removal record in the group.

7. The computing device of claim 6 wherein the location of the selected vehicle component is determined based on a location of at least one vehicle component in the group.

8. The computing device of claim 6, wherein each of the plurality of removal records comprises a timestamp, and wherein the timestamp for each of the two or more removal records in a given group falls within a predetermined time window.

9. The computing device of claim 6 wherein the two or more removal records are assigned to a corresponding group of removal records responsive to determining that a total number of removal records in the group matches a number of target locations.

10. The computing device of claim 2, wherein to determine the location of the selected vehicle component on the vehicle, the processing circuitry is configured to:
generate a set of candidate maintenance records from the plurality of maintenance records for the vehicle, wherein each candidate maintenance record is associated with one or more of the plurality of removal records based on a predetermined time window;
filter the set of candidate maintenance records according to a first predetermined criteria to generate a filtered set of candidate maintenance records;
extract the location of a vehicle component from the filtered set of candidate maintenance records; and
determine the location of the selected vehicle component to be the location extracted from the filtered set of candidate maintenance records.

11. The computing device of claim 10, wherein to generate a set of candidate maintenance records, the processing circuitry is configured to:
determine the predetermined time window for the one or more maintenance records; and
include a given maintenance record in the set of candidate maintenance records responsive to determining that:
a vehicle identifier in the given maintenance record matches a vehicle identifier in one or more of the plurality of removal records; and
a timestamp in the given maintenance record matches a removal timestamp in one or more of the plurality of removal records within a predetermined time period.

12. The computing device of claim 10, wherein the first predetermined criteria comprises a regular expression pattern representing an action performed on the selected vehicle component.

13. The computing device of claim 10, wherein to extract the location of a vehicle component from the filtered set of candidate maintenance records, the processing circuitry is configured to:
generate an ordered set of candidate maintenance records from the filtered set of candidate maintenance records according to a time of a maintenance action;
select a first candidate maintenance record from the ordered set of candidate maintenance records based on when the vehicle components associated with the ordered set of candidate maintenance records were removed from the vehicle; and
determine the location of the selected vehicle component to be the location associated with the vehicle component of the first candidate maintenance record.

14. The computing device of claim 10, wherein if the location cannot be extracted from the filtered set of candidate maintenance records, the processing circuitry is configured to:
filter the set of candidate maintenance records based on a second predetermined criteria to generate a second filtered set of candidate maintenance records;
extract the location from the second filtered set of candidate maintenance records; and
determine the location of the selected vehicle component to be the location extracted from the second filtered set of candidate maintenance records.

15. The computing device of claim 2, wherein to determine the location of the selected vehicle component on the vehicle, the processing circuitry is configured to:
generate a set of candidate removal requests from the plurality of maintenance records for the vehicle, wherein each candidate removal request is associated with one or more of the plurality of removal records based on a predetermined time window;
generate a filtered set of candidate removal requests based on one of a component name and a component part number;
extract the location of a vehicle component from the filtered set of candidate removal requests; and
determine the location of the selected vehicle component to be the location extracted from the filtered set of candidate removal requests.

16. The computing device of claim 1, wherein the processing circuitry is further configured to generate the graphical user interface to include:
the visual representation of the vehicle;
the selected vehicle component; and
the location of the selected vehicle component on the vehicle; and
to identify the location of the selected vehicle component on the vehicle.

17. A method for generating a removal prediction model for a vehicle component, the method comprising:
   obtaining a plurality of maintenance records for a vehicle, wherein the plurality of maintenance records comprise maintenance information associated with maintenance performed on vehicle components currently installed on the vehicle or previously removed from the vehicle;
   obtaining a plurality of removal records for the vehicle, wherein the plurality of removal records comprise removal information associated with vehicle components previously removed from the vehicle;
   determining, based on the plurality of maintenance records and on the plurality of removal records, a location of a selected vehicle component on the vehicle;
   generating a component removal prediction model based on the plurality of maintenance records and the plurality of removal records for the vehicle;
   predicting, based on the component removal prediction model, whether the selected vehicle component is to be removed from the vehicle; and
   responsive to determining that the selected vehicle component is to be removed, generating a graphical user interface for display to a user by:
      generating a visual representation of the vehicle for display in a first area of the graphical user interface, wherein the visual representation of the vehicle graphically represents the vehicle, the selected vehicle component, and the location of the selected vehicle component on the vehicle;
      generating one or more graphical indicators for display in a second area of the graphical user interface, wherein the one or more graphical indicators comprise information configured to visualize removal of the selected vehicle component for the user; and
      generating a hyperlink for display in a third area of the graphical user interface, wherein the hyperlink links to a section in a vehicle maintenance manual associated with a procedure for removing the selected vehicle component from the vehicle; and
      outputting the visual representation of the vehicle, the one or more graphical indicators, and the hyperlink to the graphical user interface for display to the user by:
         outputting the visual representation of the vehicle to the first area of the graphical user interface;
         outputting the one or more graphical indicators to the second area of the graphical user interface; and
         outputting the hyperlink to the third area of the graphical user interface.

18. The method of claim 17 further comprising generating a set of regular expression patterns based on one or more of:
   an operator associated with the maintenance of the vehicle;
   a model of the vehicle;
   a sub-model of the vehicle; and
   data associated with the selected vehicle component.

19. The method of claim 18 wherein determining the location of the selected vehicle component on the vehicle comprises applying the set of regular expression patterns to a component location field in one or more of the removal records.

20. The method of claim 19 wherein when the location of the selected vehicle component is not determined, the method further comprises:
   re-applying the set of regular expression patterns to one or more of a component description field, a removal reason field, and an action field in one or more of the removal records; and
   determining the location of the selected vehicle component based on the re-applying.

21. The method of claim 17 further comprising generating a set of regular expression patterns based on one or more of:
   a vehicle component identifier;
   a removal reason description;
   a removal action description;
   a removal timestamp; and
   a subset of one or more target locations for the selected vehicle component on the vehicle; and
   wherein determining the location of the selected vehicle component on the vehicle comprises:
      assigning the plurality or removal records to groups of removal records by applying the set of regular expression patterns to the plurality of removal records, wherein each group of removal records comprises two or more removal records associated with a respective vehicle component; and
      for each group of removal records:
         determining a location of at least one vehicle component in the group; and
         assigning the location of the at least one vehicle component to each removal record the group.

22. The method of claim 18, wherein determining the location of the selected vehicle component on the vehicle comprises:
   generating a set of candidate maintenance records from the plurality of maintenance records for the vehicle, wherein each candidate maintenance record is associated with one or more of the plurality of removal records based on a predetermined time window;
   filtering the set of candidate maintenance records according to a first predetermined criteria to generate a filtered set of candidate maintenance records;
   extracting the location of a vehicle component from the filtered set of candidate maintenance records; and
   determining the location of the selected vehicle component to be the location extracted from the filtered set of candidate maintenance records.

23. The method of claim 22, wherein generating a set of candidate maintenance records comprises:
   determining a predetermined time window for the one or more maintenance records; and
   including a given maintenance record in the set of candidate maintenance records responsive to determining that:
      a vehicle identifier in the given maintenance record matches a vehicle identifier in one or more of the plurality of removal records; and
      a timestamp in the given maintenance record matches a removal timestamp in one or more of the plurality of removal records within the predetermined time window.

24. The method of claim 22, wherein extracting the location of a vehicle component from the filtered set of candidate maintenance records comprises:
   generating an ordered set of candidate maintenance records from the filtered set of candidate maintenance records according to a time of a maintenance action;
   selecting a first candidate maintenance record from the ordered set of candidate maintenance records based on when the vehicle components associated with the ordered set of candidate maintenance records were removed from the vehicle; and determining the location of the selected vehicle component to be the location associated with the vehicle component of the first candidate maintenance record.

25. The method of claim 22, wherein if the location cannot be extracted from the filtered set of candidate maintenance records, the method further comprises:

filtering the set of candidate maintenance records based on a second predetermined criteria to generate a second filtered set of candidate maintenance records;

extracting the location from the second filtered set of candidate maintenance records; and determining the location of the selected vehicle component to be the location extracted from the second filtered set of candidate maintenance records.

26. The method of claim 18, wherein determining the location of the selected vehicle component on the vehicle comprises:

generating a set of candidate removal requests maintenance records from the plurality of maintenance records for the vehicle, wherein each candidate removal request is associated with one or more of the plurality of removal records based on a predetermined time window;

filtering the set of candidate removal requests based on one of a component name and a component part number to generate a filtered set of candidate removal requests;

extracting the location of a vehicle component from the filtered set of candidate removal requests; and determining the location of the selected vehicle component to be the location extracted from the filtered set of candidate removal requests.

27. A non-transitory computer-readable medium comprising instructions stored thereon that, when executed by processing circuitry of a computing device, configure the computing device to:

obtain a plurality of maintenance records for a vehicle, wherein the plurality of maintenance records comprise maintenance information associated with maintenance performed on vehicle components currently installed on the vehicle or previously removed from the vehicle;

obtain a plurality of removal records for the vehicle, wherein the plurality of removal records comprise removal information associated with vehicle components previously removed from the vehicle;

determine, based on the plurality of maintenance records and on the plurality of removal records, a location of a selected vehicle component on the vehicle;

generate a component removal prediction model based on the plurality of maintenance records and the plurality of removal records for the vehicle;

predict, based on the component removal prediction model, whether the selected vehicle component is to be removed from the vehicle; and responsive to determining that the selected vehicle component is to be removed, generate a graphical user interface for display to a user by:

generating a visual representation of the vehicle for display in a first area of the graphical user interface, wherein the visual representation of the vehicle graphically represents the vehicle, the selected vehicle component, and the location of the selected vehicle component on the vehicle;

generating one or more graphical indicators for display in a second area of the graphical user interface, wherein the one or more graphical indicators comprise information configured to visualize removal of the selected vehicle component for the user; and generating a hyperlink for display in a third area of the graphical user interface, wherein the hyperlink links to a section in a vehicle maintenance manual associated with a procedure for removing the selected vehicle component from the vehicle; and output the visual representation of the vehicle, the one or more graphical indicators, and the hyperlink to the graphical user interface for display to the user by:

outputting the visual representation of the vehicle to the first area of the graphical user interface;

outputting the one or more graphical indicators to the second area of the graphical user interface; and outputting the hyperlink to the third area of the graphical user interface.

* * * * *